(12) United States Patent
Panigot

(10) Patent No.: US 11,400,965 B2
(45) Date of Patent: Aug. 2, 2022

(54) COLLAPSIBLE SUPPORT STRUCTURE

(71) Applicant: Sunny Fold, LLC, Germantown, MD (US)

(72) Inventor: Joseph E. Panigot, Germantown, MD (US)

(73) Assignee: Sunny Fold, LLC, Germantown, MD (US)

( * ) Notice: Subject to any disclaimer, the term of this patent is extended or adjusted under 35 U.S.C. 154(b) by 121 days.

(21) Appl. No.: 16/920,822

(22) Filed: Jul. 6, 2020

(65) Prior Publication Data
US 2021/0009176 A1 Jan. 14, 2021

Related U.S. Application Data

(60) Provisional application No. 62/871,955, filed on Jul. 9, 2019.

(51) Int. Cl.
*B62B 1/12* (2006.01)
(52) U.S. Cl.
CPC .................................. *B62B 1/12* (2013.01)
(58) Field of Classification Search
CPC .... B62B 1/04; B62B 1/12; B62B 1/20; B62B 3/02
See application file for complete search history.

(56) References Cited

U.S. PATENT DOCUMENTS

| | | | |
|---|---|---|---|
| 2,287,117 A * | 6/1942 | Montalto | B65H 54/543 403/354 |
| 2,556,814 A * | 6/1951 | Love | B62B 1/042 280/659 |
| 2,757,937 A | 8/1956 | Illsley | |
| 2,992,011 A | 7/1961 | Becan | |
| 3,043,603 A | 7/1962 | Major, Sr. | |
| 3,083,995 A | 4/1963 | Bradshaw et al. | |
| 3,147,748 A | 9/1964 | Frank | |
| 3,166,339 A | 1/1965 | Earley | |
| 3,227,467 A | 1/1966 | Fugitt, Sr. | |
| 3,400,943 A | 9/1968 | Meiklejohn | |
| 3,424,474 A | 1/1969 | Karnow et al. | |

(Continued)

OTHER PUBLICATIONS

18" Seat Height Wooden Director's Chair with Black Canvas Seat, DISPLAYS2GO, https://www.displays2go.com/P-13749/Folding-Directors-Chair-Wood-Base-Trade-Shows-Promotional-Events?utm_source=google.pla&utm_medium=cpc&utm_campaign=GooglePLA&gclid=EAIaIQobChMIhLfR5KaH4gIV0sDlCh2lbwWCEAQYAiABEgJBjvD_BwE, 1 page (last accessed on May 16, 2019).

*Primary Examiner* — Bryan A Evans
(74) *Attorney, Agent, or Firm* — Edell, Shapiro & Finnan, LLC

(57) ABSTRACT

A collapsible support structure includes a horizontal support structure, a vertical support structure, a handle assembly, and an axle assembly. In use, the collapsible support structure may be folded/unfolded between a deployed configuration, in which the collapsible support structure may be capable of rolling along a support surface to transport items, and a stowed/storage position, in which the collapsible support structure is collapsed in a compact geometry for storage. The collapsible support structure includes an axle assembly that enables removal of the wheels from the axle assembly for storage, as well as a handle assembly that can slide completely underneath the horizontal support structure for storage and when not in use.

7 Claims, 22 Drawing Sheets

(56) References Cited

U.S. PATENT DOCUMENTS

| | | |
|---|---|---|
| 3,962,853 A | 6/1976 | Schwalm |
| 4,114,916 A | 9/1978 | Oyama |
| 4,262,928 A | 4/1981 | Leitzel |
| 4,323,260 A | 4/1982 | Suchy |
| 4,355,818 A | 10/1982 | Watts |
| 4,362,307 A | 12/1982 | Nakatani |
| 4,362,309 A | 12/1982 | Stamper |
| 4,376,547 A | 3/1983 | Dominko |
| 4,537,421 A | 8/1985 | Teachout |
| 4,561,674 A | 12/1985 | Alessio |
| 4,618,157 A | 10/1986 | Resnick |
| 4,645,262 A | 2/1987 | Furubotten |
| 4,671,522 A | 6/1987 | Fragione, Jr. |
| 4,733,905 A | 3/1988 | Buickerood et al. |
| 4,790,559 A | 12/1988 | Edmonds |
| 4,915,408 A | 4/1990 | Clemence et al. |
| 5,072,958 A | 12/1991 | Young |
| 5,106,112 A | 4/1992 | Sargent |
| 5,176,393 A | 1/1993 | Robertson et al. |
| 5,265,892 A | 11/1993 | Said |
| 5,312,006 A | 5/1994 | Lag |
| 5,364,112 A | 11/1994 | Jackson |
| 5,395,163 A | 3/1995 | Mandell et al. |
| 5,474,316 A | 12/1995 | Britton |
| 5,499,894 A * | 3/1996 | Alto ............ F16B 13/0808 411/340 |
| 5,667,163 A | 9/1997 | Sordahl |
| 5,692,779 A | 12/1997 | Hedgepeth |
| 5,885,047 A | 3/1999 | Davis et al. |
| 5,887,879 A | 3/1999 | Chumley |
| 5,979,921 A | 11/1999 | Derven et al. |
| 6,042,122 A | 3/2000 | Mohr |
| 6,186,520 B1 | 2/2001 | Barten |
| 6,241,276 B1 | 6/2001 | Wilburn |
| 6,364,596 B1 | 4/2002 | Spencer et al. |
| 6,375,200 B1 | 4/2002 | Harter |
| 6,460,866 B1 | 10/2002 | Altschul et al. |
| 6,471,236 B1 | 10/2002 | Eskridge |
| 6,471,237 B1 | 10/2002 | Bedsole |
| 6,474,856 B2 | 11/2002 | Billot |
| 6,557,867 B1 | 5/2003 | Angstadt |
| 6,698,811 B1 * | 3/2004 | Schuchman ......... A61G 1/0293 280/23.1 |
| 6,805,269 B2 * | 10/2004 | Lockard .............. A45F 4/02 224/153 |
| 6,808,186 B1 | 10/2004 | Su |
| 6,880,835 B2 | 4/2005 | Tornabene et al. |
| 6,880,851 B1 | 4/2005 | Summers et al. |
| 6,886,836 B1 | 5/2005 | Wise |
| 6,938,905 B1 | 9/2005 | Tsai |
| 7,017,939 B2 | 3/2006 | Darling, III |
| 7,025,363 B1 | 4/2006 | Leight |
| 7,040,635 B1 | 5/2006 | Remole |
| 7,264,265 B2 | 9/2007 | Shapiro |
| 7,316,407 B1 | 1/2008 | Elden |
| 7,448,632 B1 | 11/2008 | Neito |
| 7,464,947 B2 | 12/2008 | Cortese |
| 7,963,531 B2 | 6/2011 | Panigot |
| 8,056,573 B2 | 11/2011 | Panigot |
| 8,608,188 B2 | 12/2013 | Goldszer |
| 8,764,046 B2 | 7/2014 | Baldemor et al. |
| 8,770,597 B1 | 7/2014 | Phillips |
| 9,050,988 B1 | 6/2015 | McLeod |
| 9,150,230 B2 | 10/2015 | Panigot |
| 9,260,129 B2 | 2/2016 | Thompson |
| 9,487,225 B1 | 11/2016 | Looman |
| 9,598,095 B2 | 3/2017 | Panigot |
| 10,059,357 B2 | 8/2018 | Panigot |
| 2002/0096862 A1 | 7/2002 | Fang |
| 2002/0163163 A1 | 11/2002 | Shapiro |
| 2003/0015858 A1 * | 1/2003 | Chu ............... B62B 1/12 280/652 |
| 2003/0034636 A1 | 2/2003 | Ng |
| 2004/0046342 A1 | 3/2004 | Lin |
| 2005/0258621 A1 | 11/2005 | Johnson et al. |
| 2006/0061053 A1 | 3/2006 | Cortese |
| 2006/0207831 A1 | 9/2006 | Moore et al. |
| 2007/0194560 A1 | 8/2007 | Zink |
| 2008/0272578 A1 | 11/2008 | Tsai |
| 2008/0314300 A1 | 12/2008 | Bowsher |
| 2009/0058047 A1 | 3/2009 | Brosh et al. |
| 2009/0102248 A1 | 4/2009 | Grace et al. |
| 2010/0078907 A1 | 4/2010 | Voves |
| 2010/0078912 A1 | 4/2010 | Chang et al. |
| 2010/0308563 A1 | 12/2010 | Martin |
| 2011/0274526 A1 | 11/2011 | Kusick |
| 2011/0291390 A1 | 12/2011 | Benimeli |
| 2012/0038123 A1 | 2/2012 | Li |
| 2012/0153587 A1 | 6/2012 | Ryan |
| 2012/0160576 A1 | 6/2012 | Anasiewicz |
| 2012/0160577 A1 | 6/2012 | Anasiewicz |
| 2012/0211038 A1 | 8/2012 | Pirshafiey et al. |
| 2012/0217727 A1 | 8/2012 | Lee |
| 2013/0049333 A1 | 2/2013 | Yang |
| 2013/0147164 A1 | 6/2013 | Cooper |
| 2013/0153322 A1 | 6/2013 | Constin |
| 2014/0097599 A1 | 4/2014 | Panigot |
| 2014/0246837 A1 | 9/2014 | Delattre et al. |
| 2015/0123361 A1 | 5/2015 | Willett |
| 2016/0039441 A1 | 2/2016 | Panigot |
| 2016/0257327 A1 | 9/2016 | Gayk, Jr. et al. |
| 2017/0166230 A1 | 6/2017 | Panigot |
| 2019/0254432 A1 | 8/2019 | Panigot |

* cited by examiner

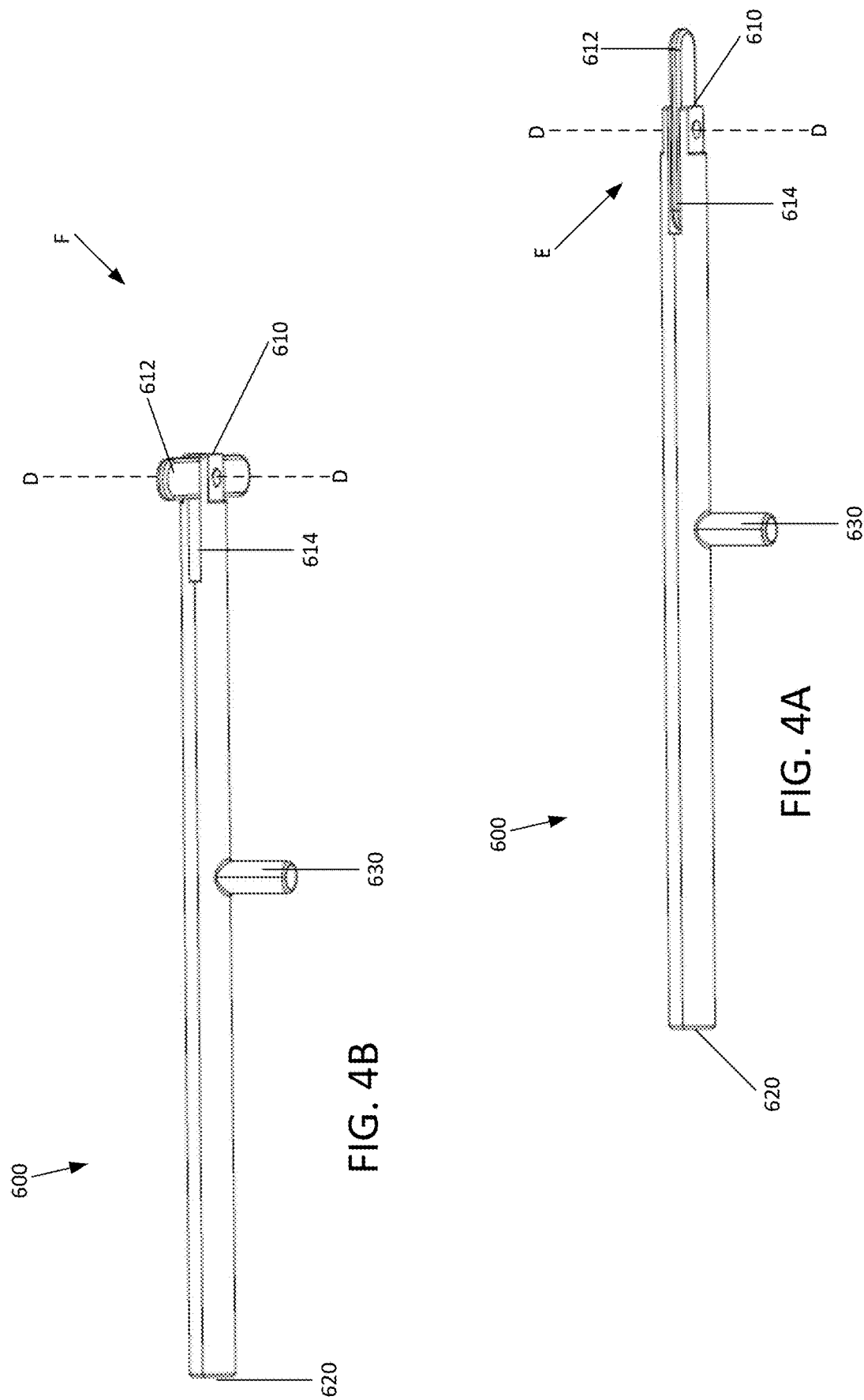

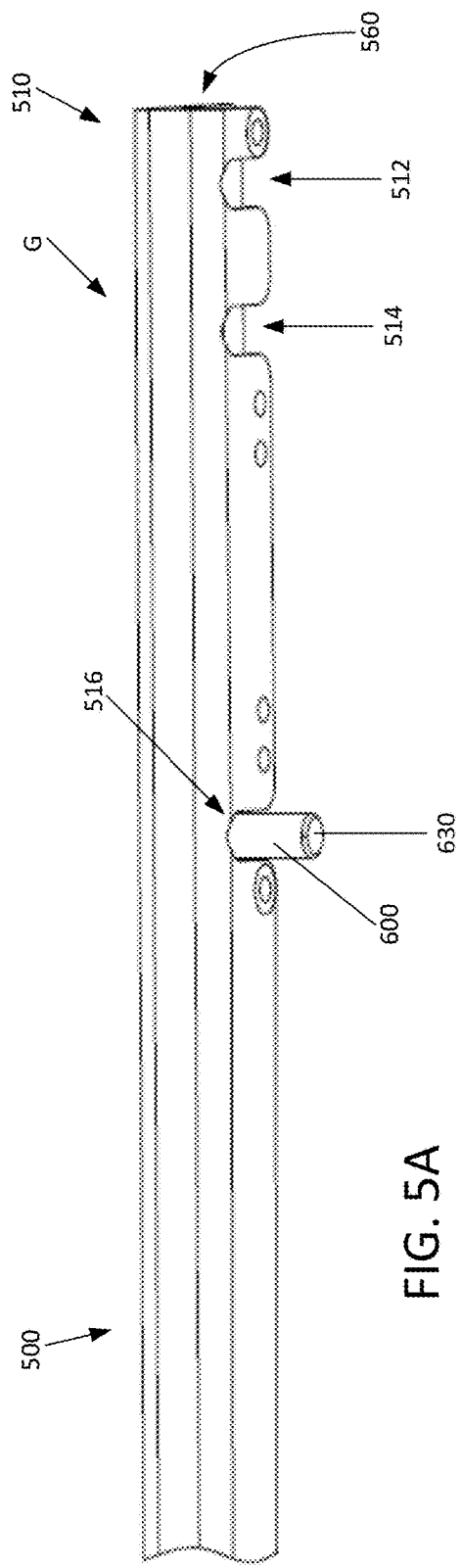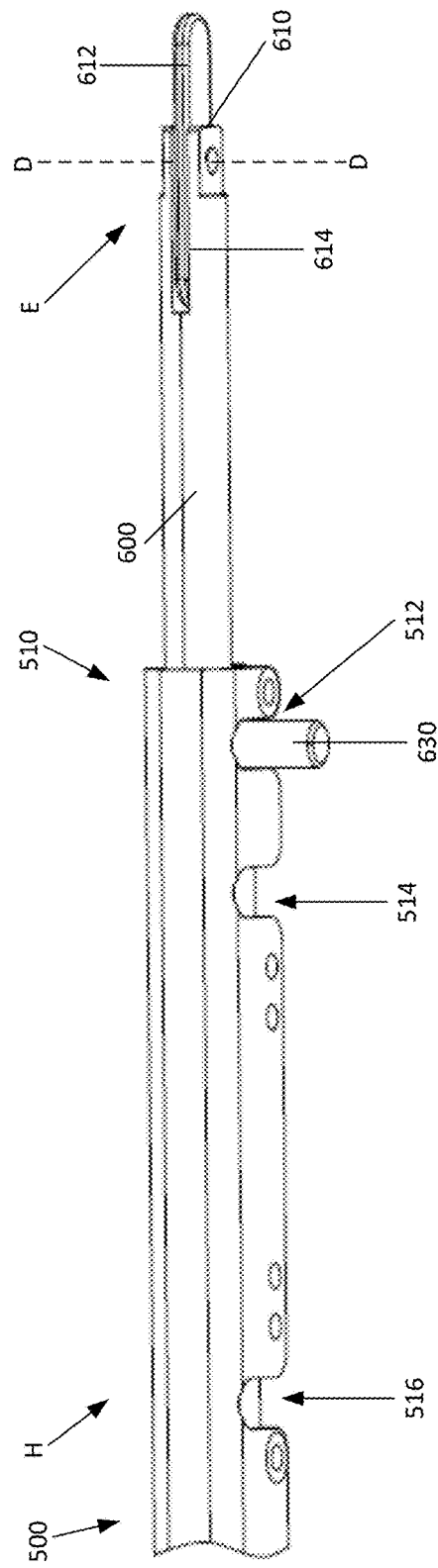
FIG. 5A
FIG. 5B

COLLAPSIBLE SUPPORT STRUCTURE

CROSS-REFERENCE TO RELATED APPLICATIONS

This application claims priority under 35 U.S.C. 119(e) to U.S. Provisional Patent Application Ser. No. 62/871,955, entitled "COLLAPSIBLE SUPPORT STRUCTURE", filed Jul. 9, 2019, the disclosure of which is incorporated herein by reference in its entirety for all purposes.

FIELD OF THE INVENTION

This invention is directed toward a collapsible support structure.

BACKGROUND OF THE INVENTION

Conventional collapsible support structures are able to be folded between a deployed configuration, in which the collapsible support structure is able to support an object above a support surface, and a storage or stowed configuration, in which the frame of the collapsible support structure is folded to lay substantially flat. While these conventional collapsible support structures are able to be folded, the fold mechanisms of these structures are often overly complex, where multiple steps must be taken in order to fold the conventional collapsible support structure between the deployed configuration and the storage configuration. These overly complex fold mechanisms often require cumbersome actions to be taken by the user in order to fold the conventional collapsible support structure. Moreover, other conventional collapsible support structures may contain overly simple fold mechanisms that are unreliable, and are capable of folding or unfolding at undesirable times.

In addition, some conventional collapsible support structures are equipped with wheels to enable the conventional collapsible support structures to travel over a support surface (i.e., the ground, a floor, etc.). However, when these conventional collapsible support structures are equipped with wheels, the wheels aren't removable making them bulky and difficult to transport to a destination or are typically difficult to remove and reassemble onto the convention collapsible support. Furthermore, when the conventional collapsible support structures are equipped with removable wheels, the wheels are often unable to efficiently roll across a support surface. Additionally, many collapsible support structures cannot accommodate large bulky items for transport such as large picnic coolers.

It would thus be desirable to provide a collapsible support structure that can be stowed in a compact configuration and includes a simple but reliable mechanism for reconfiguring the collapsible support structure between a deployed configuration and a storage configuration. It would also be highly desirable for such a collapsible support structure to easily accommodate large bulky items, such as picnic coolers, for transport. It would further be desirable to provide a collapsible support structure with a wheel and axle assembly that promotes ease of removability of the wheels from the collapsible support structure, while still enabling the wheels to roll/rotate efficiently when disposed on the collapsible support structure.

SUMMARY OF THE INVENTION

An embodiment of a collapsible support structure, as disclosed herein, includes a horizontal support structure, a vertical support structure, a handle assembly, and an axle assembly. In use, the collapsible support structure may be folded/unfolded between a deployed configuration, in which the collapsible support structure may be capable of rolling along a support surface to transport items, and a stowed/storage position, in which the collapsible support structure is collapsed in a compact geometry for storage. The collapsible support structure includes an axle assembly that enables removal of the wheels from the axle assembly for storage, as well as a handle assembly that can slide completely underneath the horizontal support structure for storage and when not in use. The collapsible support structure may be further integrated or independently embodied as, but not limited to, a utility cart, a chair, a chaise lounge, a garden cart, a bicycle utility cart, and/or a bicycle passenger cart.

BRIEF DESCRIPTION OF THE DRAWINGS

FIG. 4A illustrates a side view in elevation of an axle of the collapsible support structure shown in FIG. 1A, the rotatable tab of the axle being positioned in the aligned/stowed position.

FIG. 4B illustrates a side view in elevation of the axle shown in FIG. 4A, the rotatable tab of the axle being positioned in the transverse/deployed position.

FIG. 5A illustrates a side view of the axle assembly (i.e., axle housing and one of the axles) of the collapsible support structure shown in FIG. 1A, one end of the axle assembly shown in isolation with the axle in a stowed/storage position.

FIG. 5B illustrates a side view of the end of the axle assembly illustrated in FIG. 5A, the end of the axle assembly shown in isolation with the axle in a first deployed position, where the rotatable tab disposed in the aligned/storage position.

Like reference numerals have been used to identify like elements throughout this disclosure.

DETAILED DESCRIPTION OF THE INVENTION

Presented herein is a new and improved collapsible support structure. The collapsible support structure includes a plurality of support portions and is reconfigurable between a deployed configuration, in which the collapsible support structure can support items and facilitate transportation of items over a support surface, and a folded configuration, in which the components of the collapsible support structure lie in substantially the same plane or in closely proximate planes with one another (i.e., substantially flat and compact, compact geometry, etc.). An axle assembly may be coupled to the one of the support portions and a reconfigurable handle may also be included. A folding vertical support portion that can be fixed in place in a plane that is approximately perpendicular to a horizontal support portion support component of the collapsible support structure may also be included in the improved collapsible support structure. The axle assembly enables a set of wheels to be easily attached to the collapsible support structure to facilitate more effortless movement of the collapsible support structure across a support surface, regardless of the collapsible support structure being in the deployed configuration or the folded configuration. The axle assembly further enables wheels to be easily removed when the wheels are no longer in use or desired by the user of the collapsible support structure. Finally, the reconfigurable handle may be quickly and easily repositioned between a deployed position and a stowed position. When in the deployed position, and when the wheels are attached to the axle assembly, the handle may be utilized by a user to move and direct the collapsible support structure along a support surface.

While the embodiment of the collapsible support structure illustrated in FIGS. 1A, 1B, 2A-2C, 3, 4A, 4B, 5A-5E, 6A-6D, 7A-7D, and 8A-8C is depicted as a foldable cart with a set of wheels, the collapsible support structure may take any form that utilizes some or all of the features described herein. For example, other embodiments of the collapsible support structure may include, but are not limited to, a foldable chair, a wheel chair, a garden cart, a utility cart, a bicycle trailer, a pet trailer, a stroller, a wheelbarrow, a beach chair, a chaise lounge, a wagon, etc.

Figure 1A:
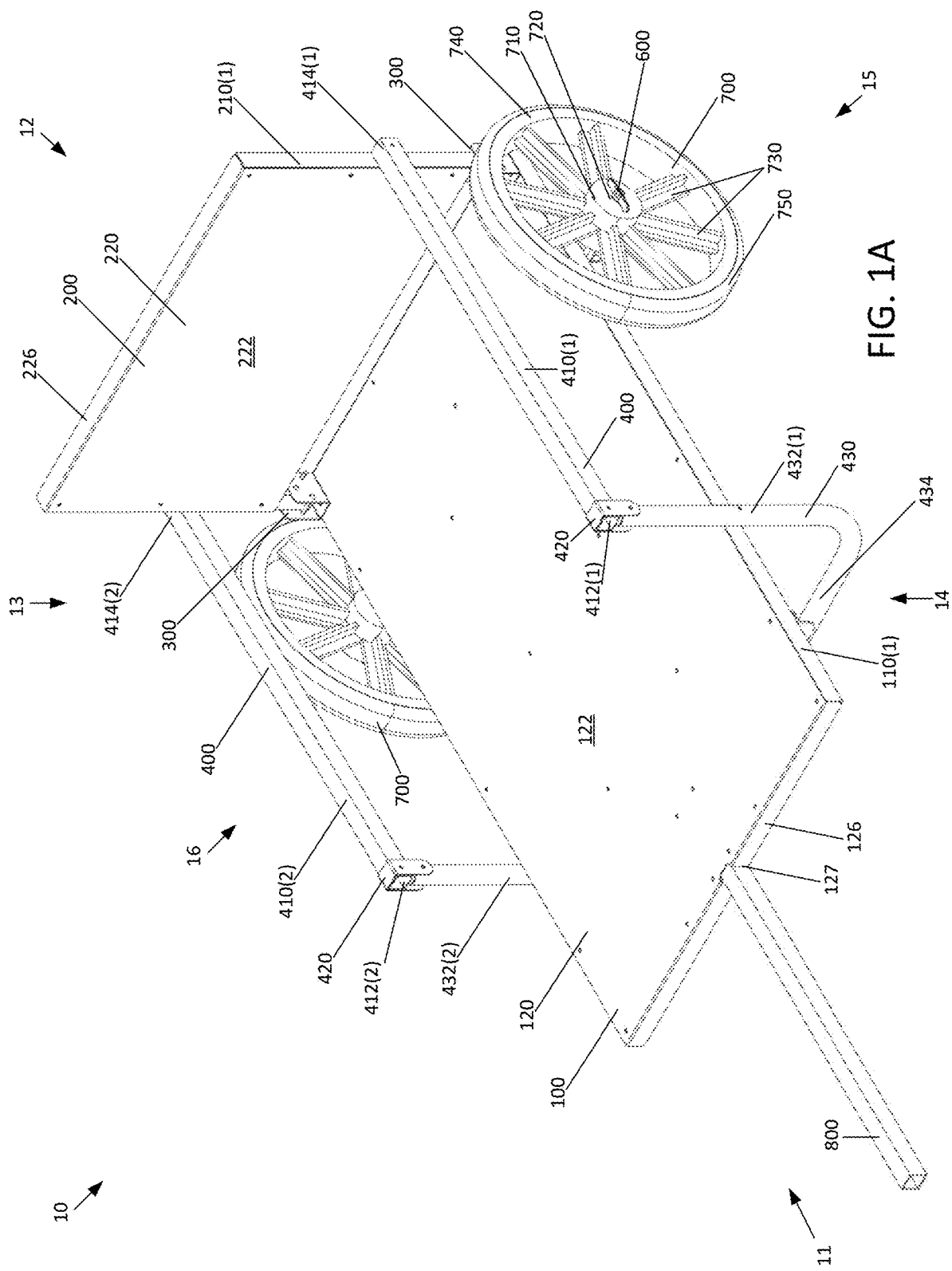
FIG. 1A illustrates a top perspective view of a collapsible support structure in accordance with an embodiment of the invention, the collapsible support structure shown in its deployed configuration.
Figure 1B:
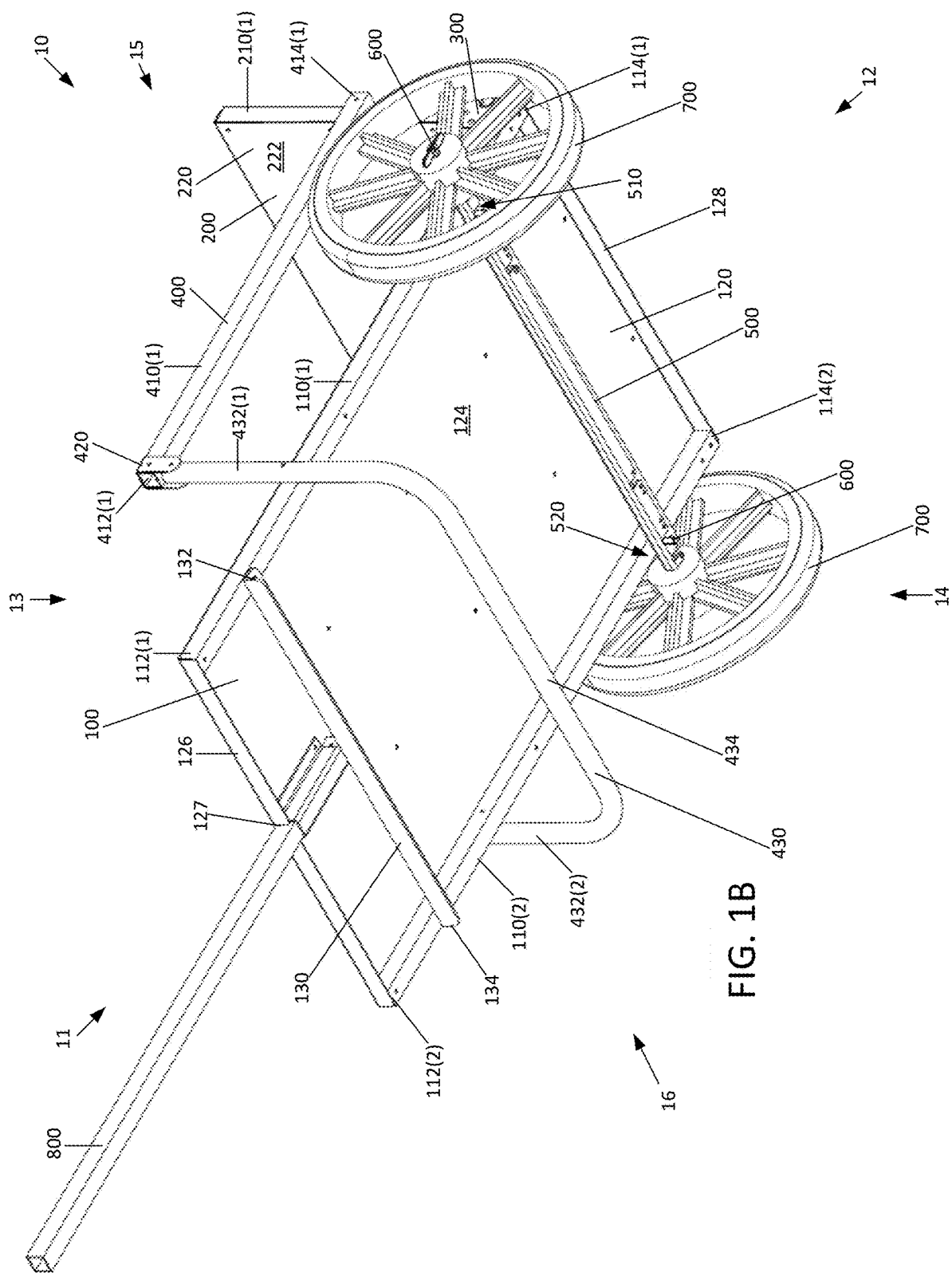
FIG. 1B illustrates a bottom perspective view of the collapsible support structure shown in FIG. 1A.

Referring to FIGS. 1A and 1B, in an embodiment, the collapsible support structure 10 includes a front end 11, a rear end 12 opposite the front end 11, a top side 13 spanning between the front end 11 and the rear end 12, a bottom side 14 opposite the top side 13, a first side 15 spanning between the front end 11 and the rear end 12, and a second side 16 opposite the first side 15. As further illustrated, the collapsible support structure 10 contains a horizontal support portion 100, a vertical support portion 200, and a pair of U-brackets 300 coupling the horizontal support portion 100 to the vertical support portion 200 proximate to the rear end 12 of the collapsible support structure 10. The collapsible support structure 10 also includes a pair of side rails 400 that are pivotally coupled to the horizontal support portion 100 and the vertical support portion 200 on the first and second sides 15, 16 of the collapsible support structure 10. FIG. 1B further illustrates that the collapsible support structure 10 further includes an axle assembly coupled to the horizontal support portion 100 proximate to the bottom side 14 and the rear end 12 of the collapsible support structure 10, where the axle assembly includes an axle housing 500, a pair of axles 600, and a pair of wheels 700. As further illustrated in FIGS. 1A and 1B, the collapsible support structure 10 may also include a repositionable handle 800 coupled to the horizontal support portion 100 proximate to the bottom side 14 and the front end 11 of the collapsible support structure 10.

Continuing with FIGS. 1A and 1B, the horizontal support portion 100 is a substantially planar and rectangular structure. In other embodiments, however, the horizontal support portion 100 may be of any other shape. As best illustrated in FIG. 1B, the horizontal support portion 100 includes a pair of longitudinal side frame members 110(1), 110(2), where longitudinal side frame member 110(1) spans from the front end 11 to the rear end 12 of the collapsible support structure 10 along the first side 15 of the collapsible support structure 10, and longitudinal side frame member 110(2) spans from the front end 11 to the rear end 12 of the collapsible support structure 10 along the second side 16 of the collapsible support structure 10. The first longitudinal side frame member 110(1) contains a first end 112(1) and a second end 114(1), while, similarly, the second longitudinal side frame member 110(2) contains a first end 112(2) and a second end 114(2). The horizontal support portion 100 further includes a substantially rigid planar surface structure 120 that contains a top surface 122 (best shown in FIG. 1A) and an opposite bottom surface 124 (best shown in FIG. 1B). The surface structure 120 further includes a front face wall 126 and a rear face wall 128 that are substantially perpendicular to the top and bottom surfaces 122, 124. As further illustrated, the front face wall 126 contains an opening 127 that is centrally located on the front face wall 126 such that the opening 127 is spaced equidistant from the first and second sides 15, 16 of the collapsible support structure 10. The longitudinal side frame members 110(1), 110(2) are coupled to the bottom surface 124 of the surface structure 120 such that the first ends 112(1), 112(2) of the longitudinal side frame members 110(1), 110(2), respectively, are located proximate to the front face wall 126, and the second ends 114(1), 114(2) of the longitudinal side frame members 110(1), 110(2), respectively, are located proximate to the rear face wall 128. Moreover, the longitudinal side frame members 110(1), 110(2) are coupled to the bottom surface 124 of the surface structure 120 such that the longitudinal side frame members 110(1), 110(2) are spaced from one another, where, as previously explained, the first longitudinal side frame member 110(1) is disposed along the first side 15 of the collapsible support structure 10, and the second longitudinal side frame member 110(2) is disposed along the second side 16 of the collapsible support structure 10. In some embodiments longitudinal side frame members 110(1), 110(2) are integrated into horizontal support portion 100 rather than being coupled to horizontal support portion 100 so that horizontal support portion 100 and longitudinal side frame members 110(1), 110(2) form one contiguous and uniform unit.

As best shown in FIG. 1B, the horizontal support portion 100 also includes a front cross brace 130 that extends across the bottom surface 124 of the surface structure 120 between the longitudinal side frame members 110(1), 110(2). Cross brace 130 is further positioned below handle 800. As illustrated, the cross brace 130 includes a first end 132 that is coupled to the first longitudinal side frame member 110(1), and an opposite second end 134 that is coupled to the second longitudinal side frame member 110(2). With the cross brace 130 being coupled directly to the longitudinal side frame members 110(1), 110(2), the cross brace 130 is sufficiently spaced from the bottom surface 124 of the surface structure 120 to permit handle 800 to be positioned between the cross brace 130 and the bottom surface 124 of the support structure 120. As illustrated the cross brace 130 is coupled to the longitudinal side frame members 110(1), 110(2) more proximate to the front end 11 of the collapsible support structure 10 than the rear end 12. In addition, the cross brace 130 contains a generally L-shaped cross sectional shape. This enables the cross brace 130 to provide torsional rigidity to the horizontal support portion 100. The cross brace 130 also restrains the handle 800 from pulling the bracket 850 down and away from the bottom surface 124 of the surface structure 120 and prevents the downward force exerted by handle 800 from pulling the fasteners that secure bracket 850 to the bottom surface 124 of the surface structure 120 out of the bottom surface 124 of the surface structure 120.

Also providing torsional rigidity to the horizontal support portion 100 is the axle housing 500. While the axle housing 500 is explained in more detail below with regard to FIGS. 3 and 5A-5E, the axle housing 500 is coupled to the longitudinal side frame members 110(1), 110(2) in a similar manner to that of the cross brace 130, where the axle housing 500 spans across, but is spaced from, the bottom surface 124 of the surface structure 120. Moreover, as best illustrated in FIG. 1B, the axle housing 500 is coupled to the longitudinal side frame members 110(1), 110(2) more proximate to the rear end 12 of the collapsible support structure 10 than the front end 11 of the collapsible support structure 10. Ideally, the axle housing 500 is coupled to the longitudinal side frame members 110(1), 110(2) at a distance from front end 11 that is sufficient for U-shaped leg member 430 to lay against longitudinal side frame members 110(1), 110(2) when the collapsible support structure 10 is configured to the folded configuration as discussed below with respect to FIG. 8C.

Figure 7A:
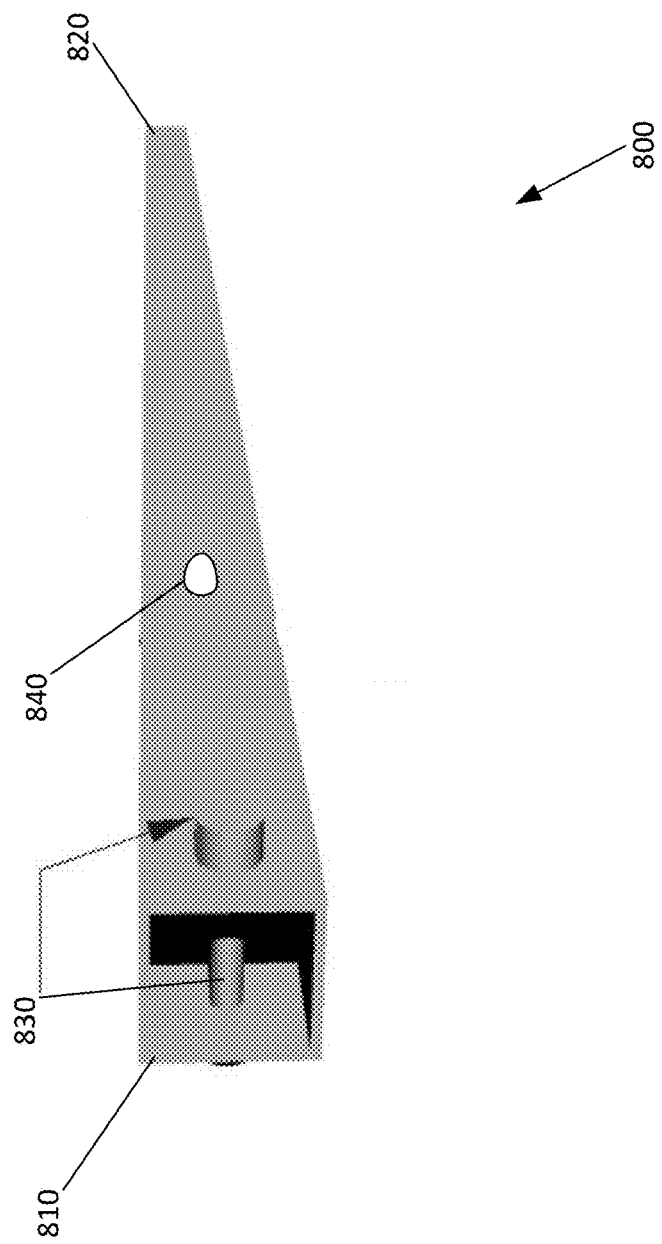
FIG. 7A illustrates a perspective view of the handle of the collapsible support structure shown in FIG. 1A, the handle shown in isolation.
Figure 7B:
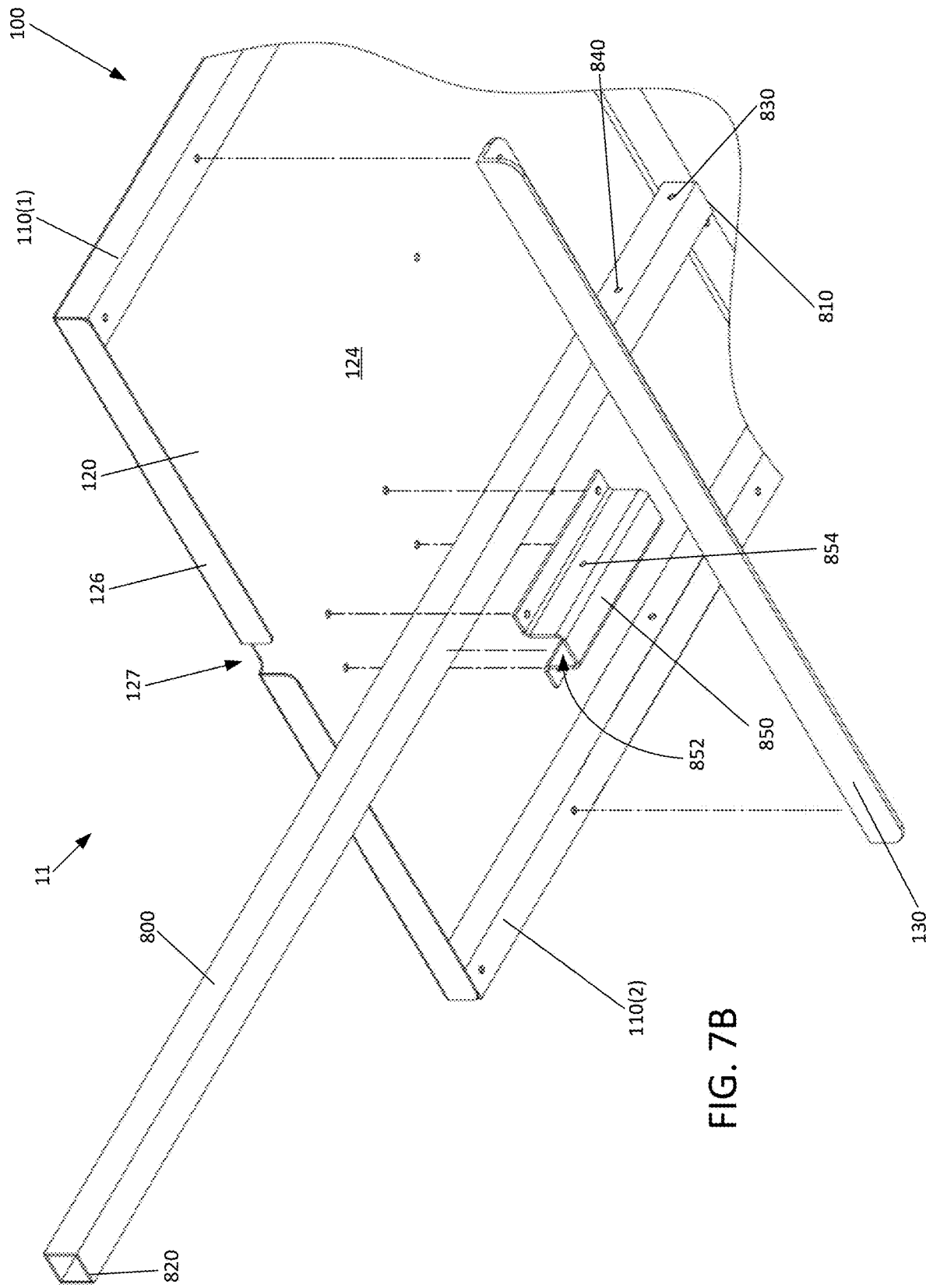
FIG. 7B illustrates an exploded perspective view of the bottom of the horizontal support portion of the collapsible support structure shown in FIG. 1A.
Figure 7C:
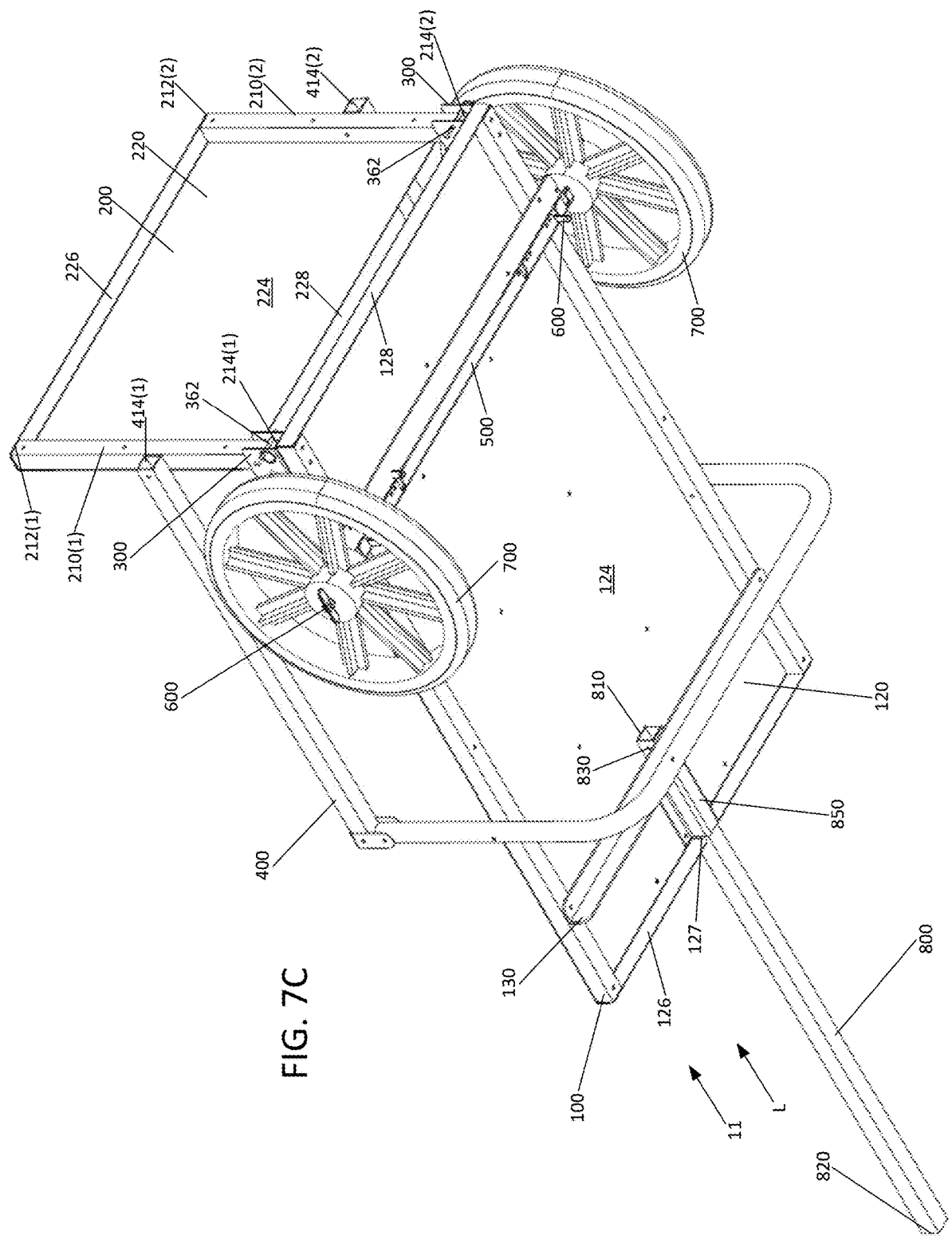
FIG. 7C illustrates a bottom perspective view of the collapsible support structure shown in FIG. 1A, where the handle is in the deployed position.
Figure 7D:
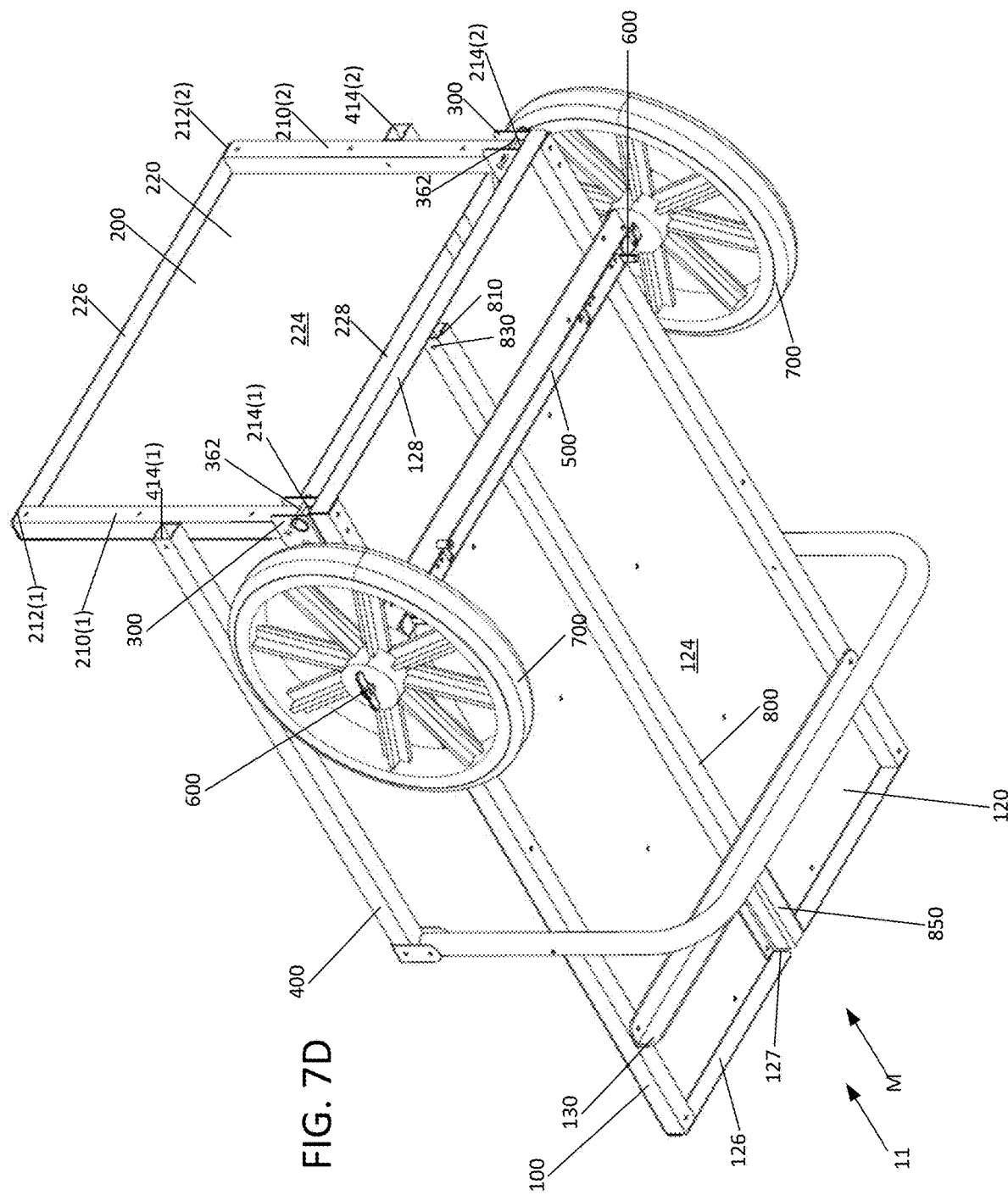
FIG. 7D illustrates a bottom perspective view of the collapsible support structure shown in FIG. 1A, where the handle is in the stowed/storage position.

Turning to FIGS. 1A, 1B, 7C, and 7D, the vertical support portion 200, like the horizontal support portion 100, is a substantially planar and rectangular structure. In other embodiments, however, the vertical support portion 200 may be of any other shape. As best illustrated in FIGS. 7C and 7D, the vertical support portion 200 includes a pair of vertical side frame members 210(1), 210(2), where the first vertical side frame member 210(1) spans generally along the first side 15 of the collapsible support structure 10, and the second vertical side frame member 210(2) spans generally along the second side 16 of the collapsible support structure 10. The first vertical side frame member 210(1) contains a first end 212(1) and a second end 214(1), while, similarly, the second vertical side frame member 210(2) also contains a first end 212(2) and a second end 214(2). The vertical support portion 200 further includes a substantially rigid planar surface structure 220 that contains a front surface 222 (best shown in FIGS. 1A and 1B) and an opposite rear surface 224 (best shown in FIGS. 7C and 7D). The surface structure 220 further includes an upper wall 226 that is substantially perpendicular to the front and rear surfaces 222, 224, and a lower edge 228. The vertical side frame members 210(1), 210(2) are coupled to the rear surface 224 of the surface structure 220 such that the first ends 212(1), 212(2) of the vertical side frame members 210(1), 210(2), respectively, are located proximate to the upper wall 226, and the second ends 214(1), 214(2) of the vertical side frame members 210(1), 210(2), respectively, extend beyond the lower edge 228. Moreover, the vertical side frame members 210(1), 210(2) are coupled to the rear surface 224 of the surface structure 220 such that the vertical side frame members 210(1), 210(2) are spaced from one another, where, as previously explained, the first vertical side frame member 210(1) is disposed along the first side 15 of the collapsible support structure 10, and the second vertical side frame member 210(2) is disposed along the second side 16 of the collapsible support structure 10.

Turning to FIGS. 1A, 1B, 2A, 2B, and 2C, a pair of U-brackets 300 pivotally couple the vertical support portion 200 to the horizontal support portion 100 proximate to the rear end 12 of the collapsible support structure 10. While FIG. 2A only illustrates a single U-bracket 300, both U-brackets illustrated in FIGS. 1A, 1B, 2B, and 2C are identical, but mirror images to one another. Thus, the discussion of FIG. 2A and the U-bracket 300 illustrated in FIG. 2A also applies to the other U-bracket 300 of the collapsible support structure 10.

Figure 2A:
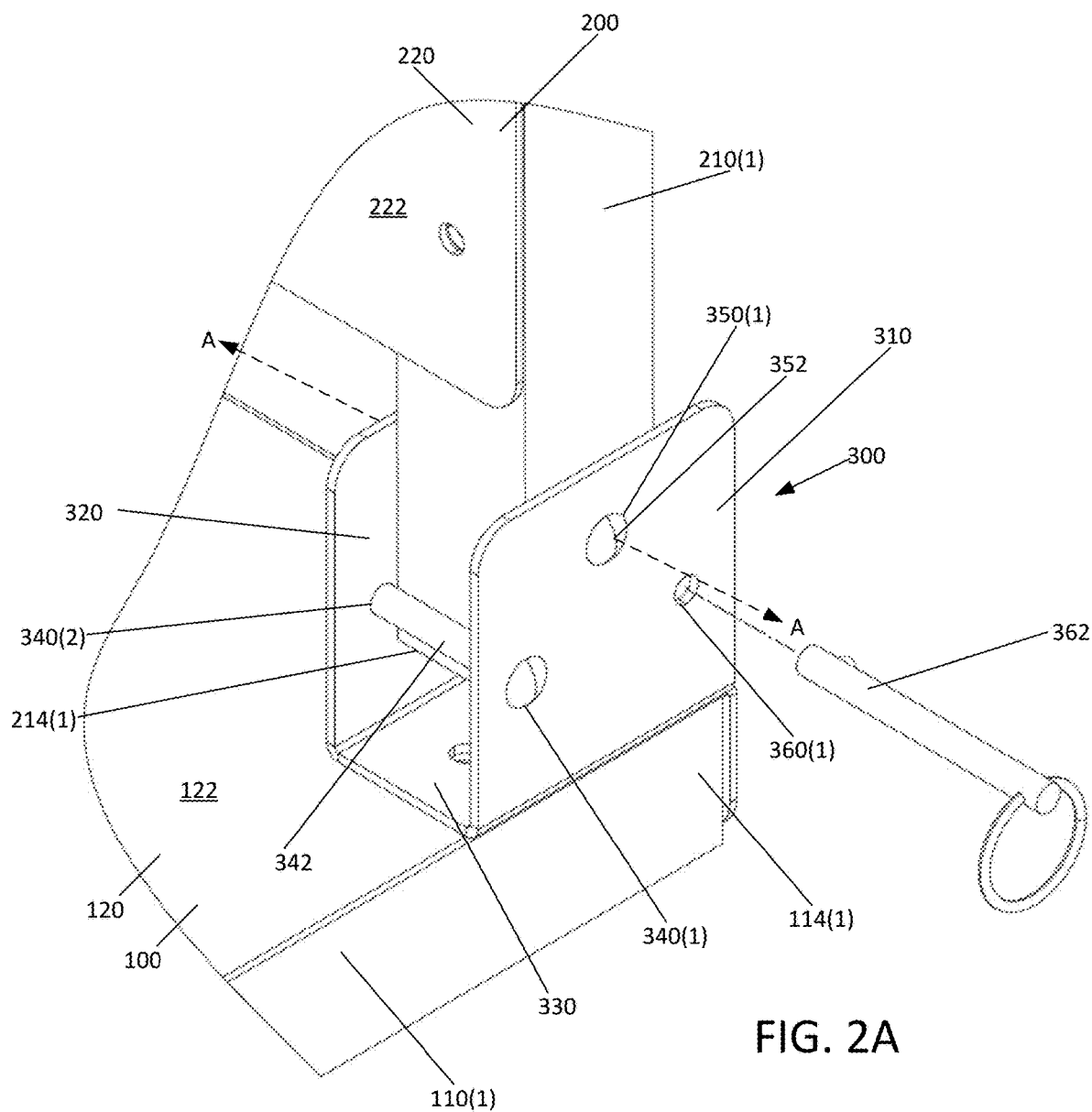
FIG. 2A illustrates a perspective view of the U-bracket for supporting the vertical support portion of the collapsible support structure shown in FIG. 1A.

As illustrated in FIG. 2A, the U-bracket 300 is substantially U-shaped with an outer portion 310 disposed in a generally vertical position, an inner portion 320 opposite the outer portion 310 and also disposed in a generally vertical position, and a lower portion 330 coupled to the lower ends of the outer and inner portions 310, 320. As best illustrated in FIG. 2A, the lower portion 330 is disposed on the top surface 122 of the surface structure 120 of the horizontal support portion 100 proximate to the second end 114(1) of the first longitudinal side frame member 110(1). In some embodiments, the lower portion 330 of the U-bracket 300 may be coupled to both the longitudinal side frame member 110(1) and the surface structure 120, while in other embodiments, the lower portion 330 of the U-bracket 300 may be coupled to the longitudinal side frame member 110(1) or the surface structure 120.

As further illustrated in FIG. 2A, the U-bracket 300 includes a first series of openings 340(1), 340(2) in the outer and inner portions 310, 320 that are aligned with one another, and a second series of openings 350(1), 350(2) (only opening 350(1) is illustrated) disposed in the outer and inner portion 310, 320 that are also aligned with one another. A first rivet or other type of fastener (e.g., bolt, screw, post, etc.) may be affixed to the outer and inner portions 310, 320 through the first series of openings 340(1), 340(2), while a second rivet or other type of fastener (e.g., bolt, screw, post, etc.) may be affixed to the outer and inner portions 310, 320 through the second series of openings 350(1), 350(2) (only opening 350(1) is illustrated). FIG. 2A also illustrates that the U-bracket 300 includes a third series of openings 360(1), 360(2) (only opening 360(1) is illustrated) disposed in the outer and inner portions 310, 320, where the third series of openings 360(1), 360(2) are aligned with one another. The third series of openings 360(1), 360(2) are configured to removably receive a removable pin 362.

Figure 2B:
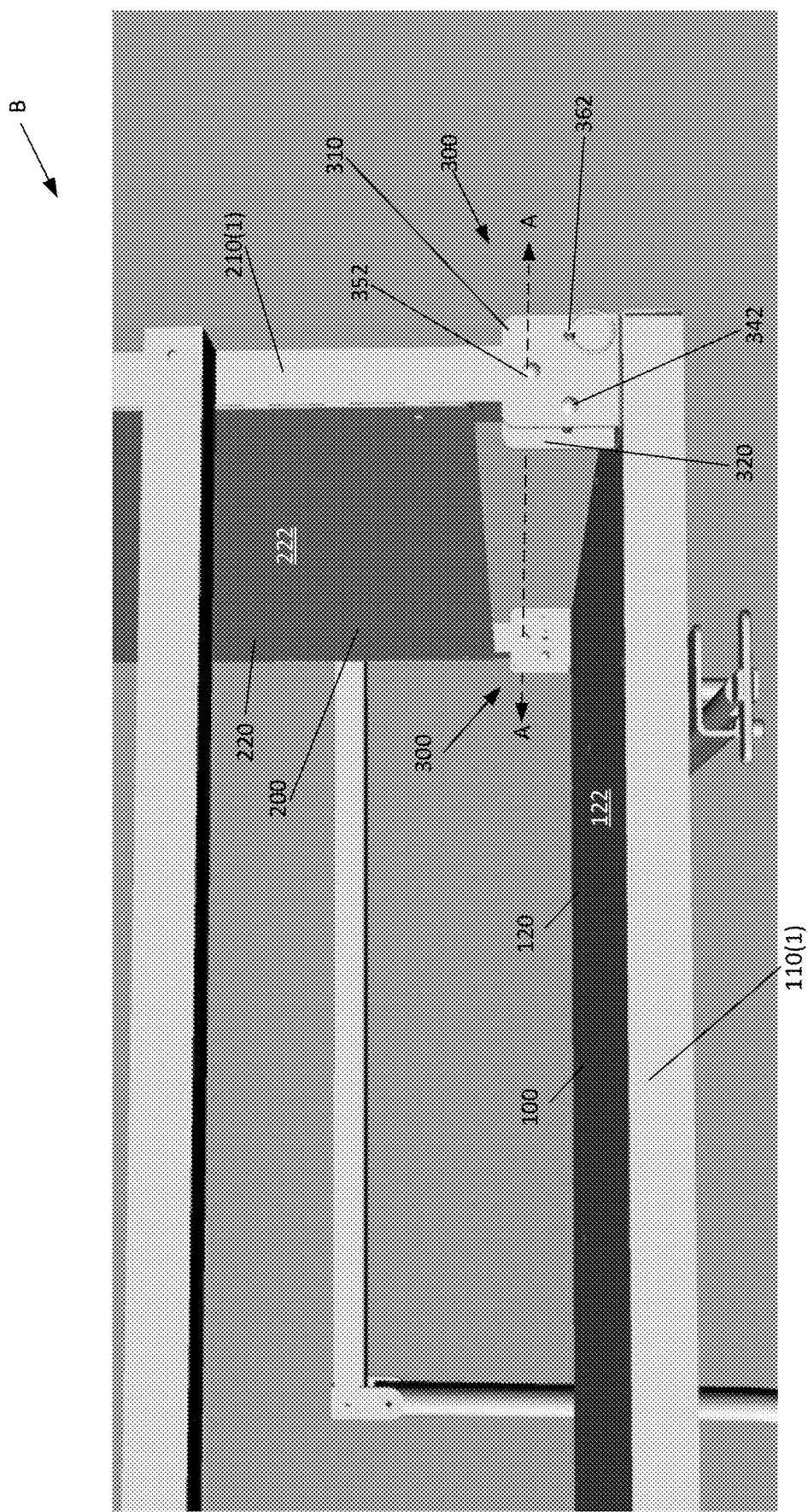
FIG. 2B illustrates a side view in elevation of the collapsible support structure shown in FIG. 1A with the wheels removed and the vertical support portion in a fully deployed position with respect to the U-bracket.
Figure 2C:
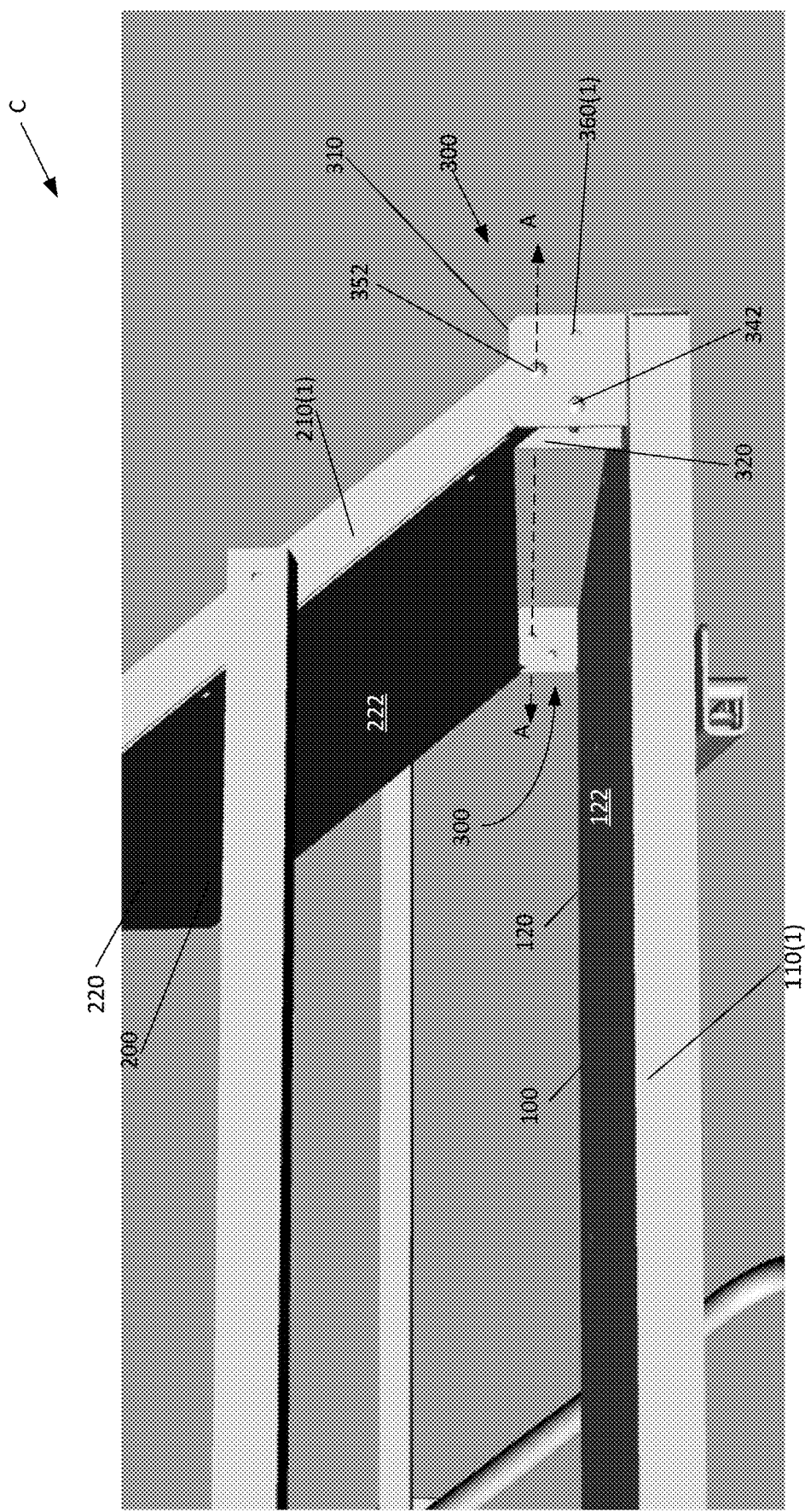
FIG. 2C illustrates a side view in elevation of the collapsible support structure shown in FIG. 1A with the wheels removed and the vertical support portion in a partially folded of forward position with respect to the U-bracket.

Continuing with FIG. 2A, the outer and inner portions 310, 320 are spaced from one another a distance that is large enough to receive the second end 214(1) of the first vertical side frame member 210(1) of the vertical support portion 200. The second rivet 352 is configured to extend through the second end 214(1) of the first vertical side frame member 210(1) as it extends between the outer and inner portion 310, 320 such that the first vertical side frame member 210(1), and consequently, the vertical support portion 200, rotates about axis A, which is coaxial to the second rivet 352. The first rivet 342 is configured to prevent the vertical support portion 200 from rotating past a substantially vertical position (i.e., the position B shown in 2B) when the vertical support portion 200 is rotated about axis A in the clockwise direction when viewed from first side 15 of the collapsible support structure 10. As best illustrated in FIGS. 2A and 2B, when the removable pin 362 is inserted through the third series of openings 360(1), 360(2), the vertical support portion 200 is prevented from rotating about axis A, and is prevented from being reconfigured from the vertical position B. However, as illustrated in FIG. 2C, once the removable pin 362 is removed, the vertical support portion 200 is capable of rotating about axis A in a counter-clockwise direction when viewed from first side 15 of the collapsible support structure 10 to a folding position C, where the front surface 222 of the vertical support portion 200 being folded toward the top surface 122 of the horizontal support portion 100. In some embodiments, when in the vertical support portion 200 is completely folded toward the horizontal support portion 100 (i.e., the front surface 222 of the vertical support portion 200 is disposed against or proximate to the top surface of the horizontal support portion 100) (as shown in FIG. 8C), the removable pin 362 may be reinserted into the third series of openings 360(1), 360(2) to retain the vertical support portion 200 in the completely folded position (as shown in FIG. 8C).

In another embodiment, the pair of U-brackets 300 illustrated in FIGS. 2A, 2B, and 2C may not contain the third series of openings 360(1), 360(2), and thus, may not utilize the removable pins 362. This embodiment of the pair of the U-brackets 300 may still be equipped with at least 352, or another similar type of fastener, such that the vertical support portion 200 still rotates about axis A with respect to the pair of U-brackets 300. The vertical support portion 200 may be retained or secured in the vertical position B (shown in FIG. 2B) by a means other than that regarding the removable pins 362 described above, such as, but not limited to, friction between the vertical side frame members 210(1), 210(2) and the outer and inner portions 310, 320 of the pair of U-brackets 300, locking positions of the rivet 352 with respect to the vertical side frame members 210(1), 210(2) and/or the outer and inner portions 310, 320 of the pair of U-brackets 300, and/or the positioning of the vertical side frame members 210(1), 210(2) beyond vertical (i.e., rotating the vertical support portion 200 more than 90 degrees when transitioning from the folded position C to the vertical position B such that the vertical side frame members 210(1), 210(2) are slightly offset from vertical) so that they are contacted, and further impeded from rotating, by the first rivet 342.

As previously stated, and as illustrated in FIGS. 1A and 1B, the collapsible support structure 10 further includes a pair of side rails 400 that are pivotally coupled to the horizontal support portion 100 and the vertical support portion 200 on the first and second sides 15, 16 of the collapsible support structure 10. The side rails 400 comprise of two horizontal elongate members 410(1), 410(2). The first horizontal elongate member 410(1) is disposed along the first side 15 of the collapsible support structure 10, while the second horizontal elongate member 410(2) is disposed along the second side 16 of the collapsible support structure 10. As further illustrated, the first horizontal elongate member 410(1) contains a first end 412(1) and an opposite second end 414(1). Similarly, the second horizontal elongate member 410(2) contains a first end 412(2) and an opposite second end 414(2). The second end 414(1) of the first horizontal elongate member 410(1) is pivotally coupled to the first vertical side frame member 210(1) of the vertical support portion 200, while the second end 414(2) of the second horizontal elongate member 410(2) is pivotally coupled to the second vertical side frame member 210(2) of the vertical support portion 200 (see FIGS. 7C and 7D). FIGS. 1A and 1B also illustrated that brackets 420 may be coupled to each of the first ends 412(1), 412(2) of the horizontal elongate members 410(1), 410(2), respectively, such that the brackets are unable to pivot with respect to the first ends 412(1), 412(2).

As illustrated in FIGS. 1A and 1B, the side rails 400 may further include a U-shaped leg member 430 that is pivotally coupled to the brackets 420, and thus, indirectly pivotally coupled to the first ends 412(1), 412(2) of the horizontal elongate members 410(1), 410(2), respectively. The U-shaped leg member 430 may include a first vertical section 432(1), a second vertical section 432(2), and a horizontal section 434 coupled to the first and second vertical sections 432(1), 432(2). As shown, the first vertical section 432(1) is pivotally coupled to the bracket 420 coupled to the first end 412(1) of the first horizontal elongate member 410(1), and pivotally coupled to the first longitudinal side frame member 110(1) of the horizontal support portion 100. Similarly, the second vertical section 432(2) is pivotally coupled to the bracket 420 coupled to the first end 412(2) of the second horizontal elongate member 410(2), and pivotally coupled to the second longitudinal side frame member 110(2) of the horizontal support portion 100. In addition, the horizontal section is configured to engage a support surface to support the front end 11 of the collapsible support structure 10 above the support surface.

Moreover, as explained in further detail below, with the horizontal elongate members 410(1), 410(2) being pivotally coupled to the vertical side frame members 210(1), 210(2), respectively, of the vertical support portion 200, and the U-shaped leg member 430 being pivotally coupled to the brackets 420 and the longitudinal side frame members 110(1), 110(2) of the horizontal support portion 100, as the vertical support portion 200 is rotated toward the horizontal support portion 100 (i.e., to the folded position C), the pair of side rails 400 are also configured to pivot about their respective pivot points to translate the horizontal elongate members 410(1), 410(2) toward the horizontal support portion 100 and to rotate the horizontal section 434 of the U-shaped leg member 430 toward the bottom surface 122 of the horizontal support portion 100.

Figure 3:
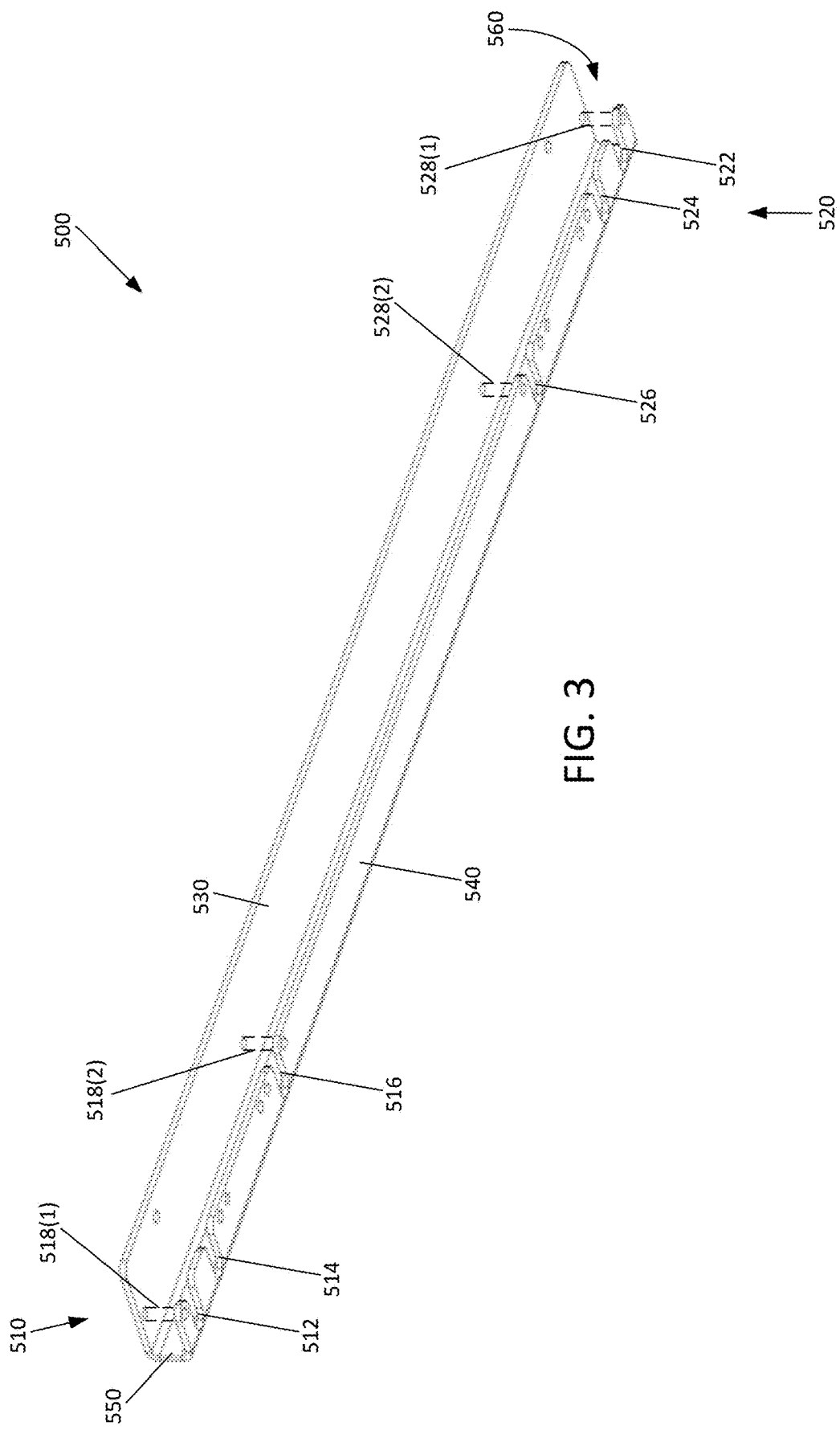
FIG. 3 illustrates a perspective view of the axle housing of the collapsible support structure shown in FIG. 1A.

Turning to FIGS. 3, 4A, 4B, and 5A-5E, as previously explained, the collapsible support structure 10 may be equipped with an axle assembly, which includes an axle housing 500, a pair of axles 600, and a pair of wheels 700. As best illustrated in FIG. 3, the axle housing 500 is substantially elongate with a first end (or distal end) 510, and an opposite second end (or proximal end) 520. As further illustrated in FIG. 3, the axle housing 500 includes a top side or top planar portion 530, an opposite bottom side or bottom planar portion 540, and an intermediate side or intermediate planar portion 550 that extends between the top and bottom sides 530, 540. The three sides 530, 540, 550 collectively form channel 560 with an open side that faces in the rearward direction of the collapsible support structure 10 (as best illustrated in FIGS. 1B, 7C, and 7D). Thus, the channel 560 may be partially enclosed. In other embodiments the open side may face in a forward direction. Thus, a cross-section of the axle housing 500 is substantially U-shaped. As previously explained, the axle housing 500 is coupled to the horizontal support portion 100 proximate to the rear end 12 of the collapsible support structure 10. Moreover, as illustrated in FIG. 1B, the axle housing 500 is coupled to the horizontal support portion 100 such that the first end 510 of the axle housing 500 is coupled to the first longitudinal side frame member 110(1), while the second end 520 of the axle housing 500 is coupled to the second longitudinal side frame member 110(2).

As further illustrated in FIG. 3, the axle housing 500 may include three slots 512, 514, and 516 and two pillars 518(1), 518(2) (shown in phantom) proximate the first end 510. The first or outermost slot 512 may be disposed most proximate to the first end 510, while the third or innermost slot 516 may be disposed farthest away from the first end 510 of the three slots 512, 514, 516. The second or intermediate slot 514 may be disposed between the outermost slot 512 and the innermost slot 516. The first pillar 518(1) may be disposed proximate to the first end 510 and the outermost slot 512 such that the first pillar 518(1) extends between the top side 530 and the bottom side 540, but is spaced from the intermediate side 550. The second pillar 518(2) may be disposed proximate to the innermost slot 516 such that, similar to the first pillar 518(1), the second pillar 518(2) extends between the top side 530 and the bottom side 540, but is spaced from the intermediate side 550. The pillars 518(1), 518(2) serve to retain one of the axles 600 within the channel 560 proximate to the first end 510, while still enabling the axle to slide through a portion of the channel 560.

The second end 520 of the axle housing 500 may be a mirror image of the first end 510. As illustrated in FIG. 3, the axle housing 500 may further include three additional slots 522, 524, and 526 and two additional pillars 528(1), 528(2) (shown in phantom) proximate the second end 520. The fourth or outermost slot 522 may be disposed most proximate to the second end 520, while the sixth or innermost slot 526 may be disposed farthest away from the second end 520 of the three additional slots 522, 524, 526. The fifth or intermediate slot 524 may be disposed between the outermost slot 522 and the innermost slot 526. The third pillar 528(1) may be disposed proximate to the second end 520 and the outermost slot 522 such that the third pillar 528(1) extends between the top side 530 and the bottom side 540, but is spaced from the intermediate side 550. The fourth pillar 528(2) may be disposed proximate to the innermost slot 526 such that, similar to the third pillar 528(1), the fourth pillar 528(2) extends between the top side 530 and the bottom side 540, but is spaced from the intermediate side 550. The pillars 528(1), 528(2) serve to retain one of the axles 600 within the channel 560 proximate to the second end 520, while still enabling the axle to slide through a portion of the channel 560.

Turning to FIGS. 4A and 4B, illustrated are isolated views of one of the axles 600. While only a single axle is illustrated in FIGS. 4A and 4B, the discussion of FIGS. 4A and 4B applies to both axles 600 as they are identical to one another. The axle 600 contains a substantially cylindrical elongate shape with a first end 610 and a second end 620. The first end 610 includes a rotatable tab 612 disposed, at least partially, within a linear slot 614 (i.e., the rotatable tab 612 is rotatably coupled to the first end 610 of the axle 600). The rotatable tab 612 is configured to rotate about an axis D that extends through the first end 610 of the axle 600 and is transverse to an axis extending through the length of the axle 600. As shown in FIGS. 4A and 4B, the rotatable tab 612 is configured to rotate between an aligned/storage position E (shown in FIG. 4A) and a transverse/deployed position F (shown in FIG. 4B), where the rotatable tab 612 rotates about axis D to be repositioned between the two positions E, F. When the rotatable tab 612 is in the aligned position E, the rotatable tab 612 is collinear with the axle 600, or is aligned with the axle 600 such that the rotatable tab 612 extends in the same direction as, or at least partially along, the axle 600 (i.e., the rotatable tab 612 extends along an axis that extends through the length of the axle 600 such that the rotatable tab 612 is substantially coaxial with the axle 600). Thus, when the rotatable tab 612 is in the aligned position E, a larger portion of the rotatable tab 612 is disposed within the slot 614 than when the rotatable tab 612 is in the transverse position F. When the rotatable tab 612 is in the transverse/deployed position F, the rotatable tab 612 is oriented transverse to the length of the axle 600 (i.e., the rotatable tab 612 extends across the end 610 of the axle 600 such that the rotatable tab 612 extends across, or is transverse to, the axis that extends through the length of the axle 600). As further illustrated in FIGS. 4A and 4B, a protrusion 630 extends from the axle 600 at a location between the first end 610 and the second end 620. The protrusion 630 may be sized and shaped to fit within the slots 512, 514, 516, 522, 524, 526 of the axle housing 500.

Returning to FIGS. 1A and 1B, the wheels 700 are configured to be disposed on the axles 600 to support the rear end 12 of the collapsible support structure 10 above a support surface, while also enabling the collapsible support structure 10 to roll over a support surface. As illustrated in FIGS. 1A and 1B, each wheel 700 includes a central hub 710 that contains a central opening 720 extending through the hub 710. Extending radially from the hub 710 around the periphery of the hub 710 is a series of spokes or pillars 730. Disposed around the radially extending spokes 730 is a circular rim 740, upon which a tire 750 may be affixed. In some embodiments, the wheel 700 may be a unitary structure that may only include a central hub 710 having a central opening 720, and may not contain any spokes 730 or a tire 750 affixed to a rim 740.

Figure 5C:
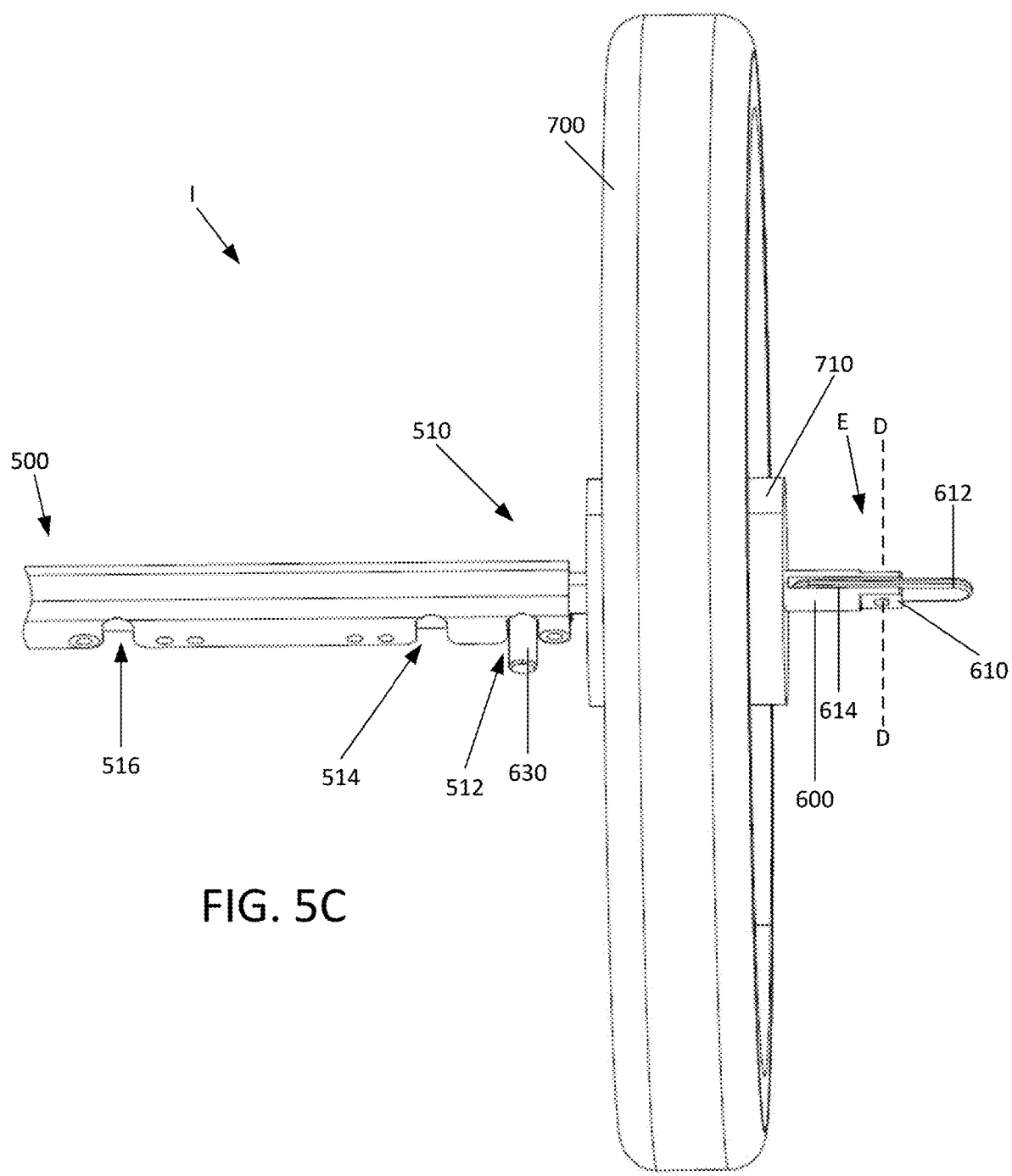
FIG. 5C illustrates a side view of the end of the axle assembly illustrated in FIG. 5A, the end of the axle assembly shown in isolation with the axle in a second deployed position where the rotatable tab is disposed in the aligned/storage position, and a wheel is disposed on the axle.

Turning to FIGS. 5A-5E, illustrated are isolated views of the first end 510 of the axle housing 500 with the axle 600 slidably disposed within the channel 560 of the axle housing 500. FIGS. 5A-5E illustrate the steps taken to deploy and axle and removably secure a wheel 700 on the axle 600. While FIGS. 5A-5E only illustrate the first end 510 of the axle housing 500, one of the axles 600, and one of the wheels 700, the discussion of FIGS. 5A-5E applies to the second end 520 of the axle housing, the second axle 600, and the second wheel 700, as they are identical, but mirrored, to the first end 510 of the axle housing 500, the first axle 600, and the first wheel 700. As illustrated in FIG. 5A, the axle 600 is slidably disposed within the channel 560 of the axle housing 500 in a stowed or storage configuration G. When the axle 600 is disposed in the storage position G, the protrusion 630 of the axle 600 may be disposed within the innermost slot 516 of the axle housing 500, which serves to retain the axle 600 in the storage position G. While not illustrated, when the axle is in the storage position G, the rotatable tab 612 must be in the aligned position E on the first end 610 of the axle 600.

When a user wishes to deploy the axle 600 and secure a wheel 700 to the axle 600, the axle 600 must be rotated within the channel 560 until the protrusion 630 is no longer disposed within the innermost slot 516 (approximately 90 degrees), and then the axle can be slid or pulled until the protrusion 630 is aligned with the outermost slot 512 of the axle housing 500 (e.g., the first pillar 518(1) may engage the protrusion 630 to prevent the axle 600 from sliding completely out of the channel 560). The axle 600 may then be rotated until the protrusion 630 is disposed within the outermost slot 512 (approximately 90 degrees), and the axle assembly is in the first deployed configuration H, as illustrated in FIG. 5B. As FIG. 5B illustrates, when the axle 600 is in the first deployed configuration H, the first end 610 of the axle 600 extends from the first end 510 of the axle housing 500. In this first deployed configuration H, the rotatable tab 612 is still disposed in the aligned position E.

As illustrated in FIG. 5C, the user may then place a wheel 700 onto the axle 600 by sliding the wheel 700 over the first end 610 of the axle 600 such that the first end 610 of the axle 600 slides through the opening 720 of the hub 710 of the wheel 700. The wheel 700 is slid onto the first end 610 of the axle 600 toward the first end 510 of the axle housing 500 until the hub 710 slides past the rotatable tab 612 and the slot 614 of the first end 610 of the axle 600. Thus, the axle assembly, as shown in FIG. 5C, is in the second deployed configuration I.

Figure 5D:
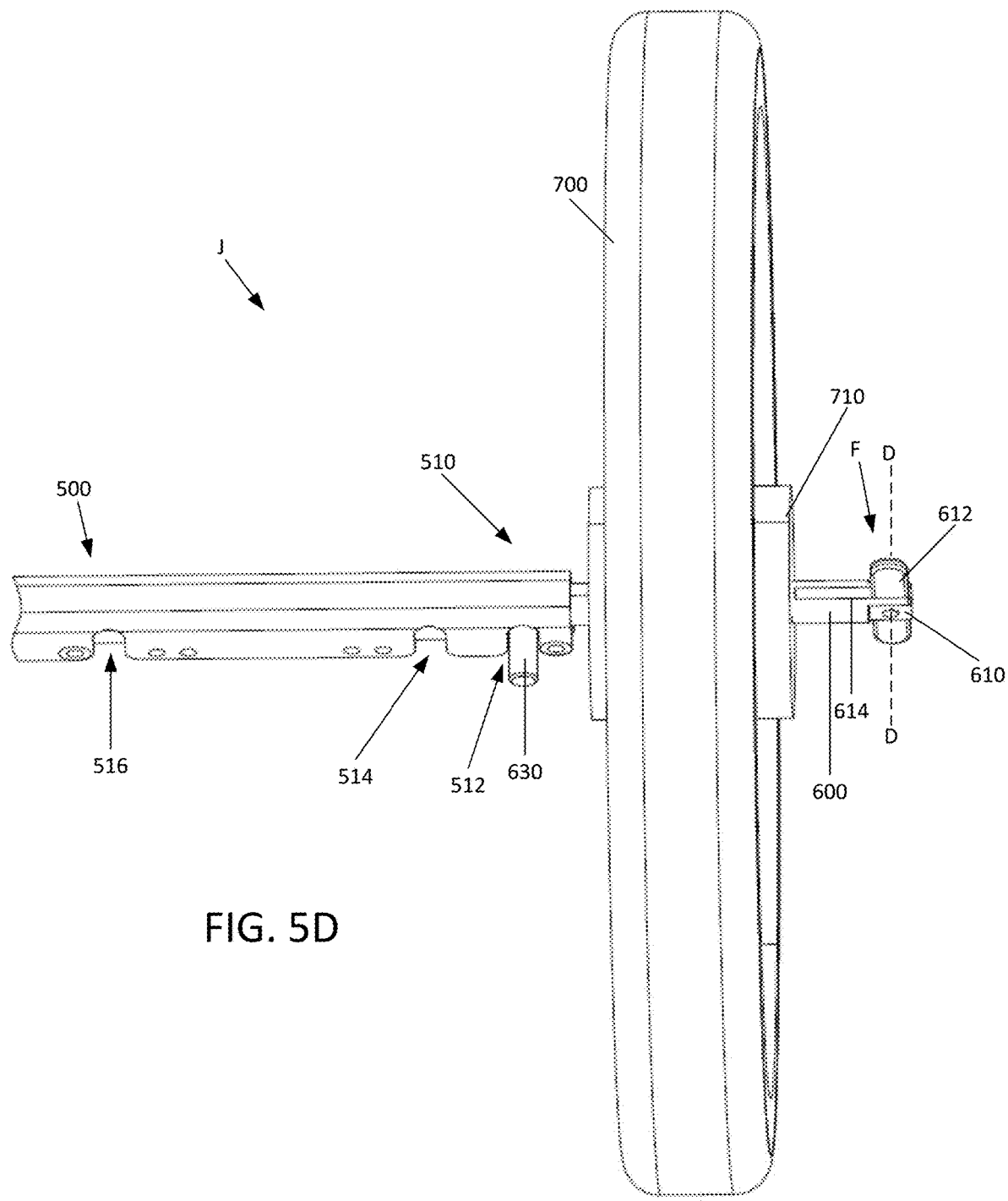
FIG. 5D illustrates a side view of the end of the axle assembly illustrated in FIG. 5A, the end of the axle assembly shown in isolation with the axle in a third deployed position, where the wheel is disposed on the axle and the rotatable tab is disposed in the transverse/deployed position.

As illustrated in FIG. 5D, the axle assembly may be reconfigured to the third deployed configuration J by rotating the rotatable tab 612 about axis D to the transverse position F. As illustrated in FIG. 5D, with the rotatable tab 612 in the transverse position F, the wheel 700 is secured to the axle 600 and cannot slide beyond the first end 610 of the axle 600. Because the rotatable tab 612 has a length that is greater than the diameter of the opening 720 of the hub 710 of the wheel 700, the wheel 700 is prevented from sliding past the first end 610 of the axle 600 when the rotatable tab 612 is in the transverse position F.

Figure 5E:
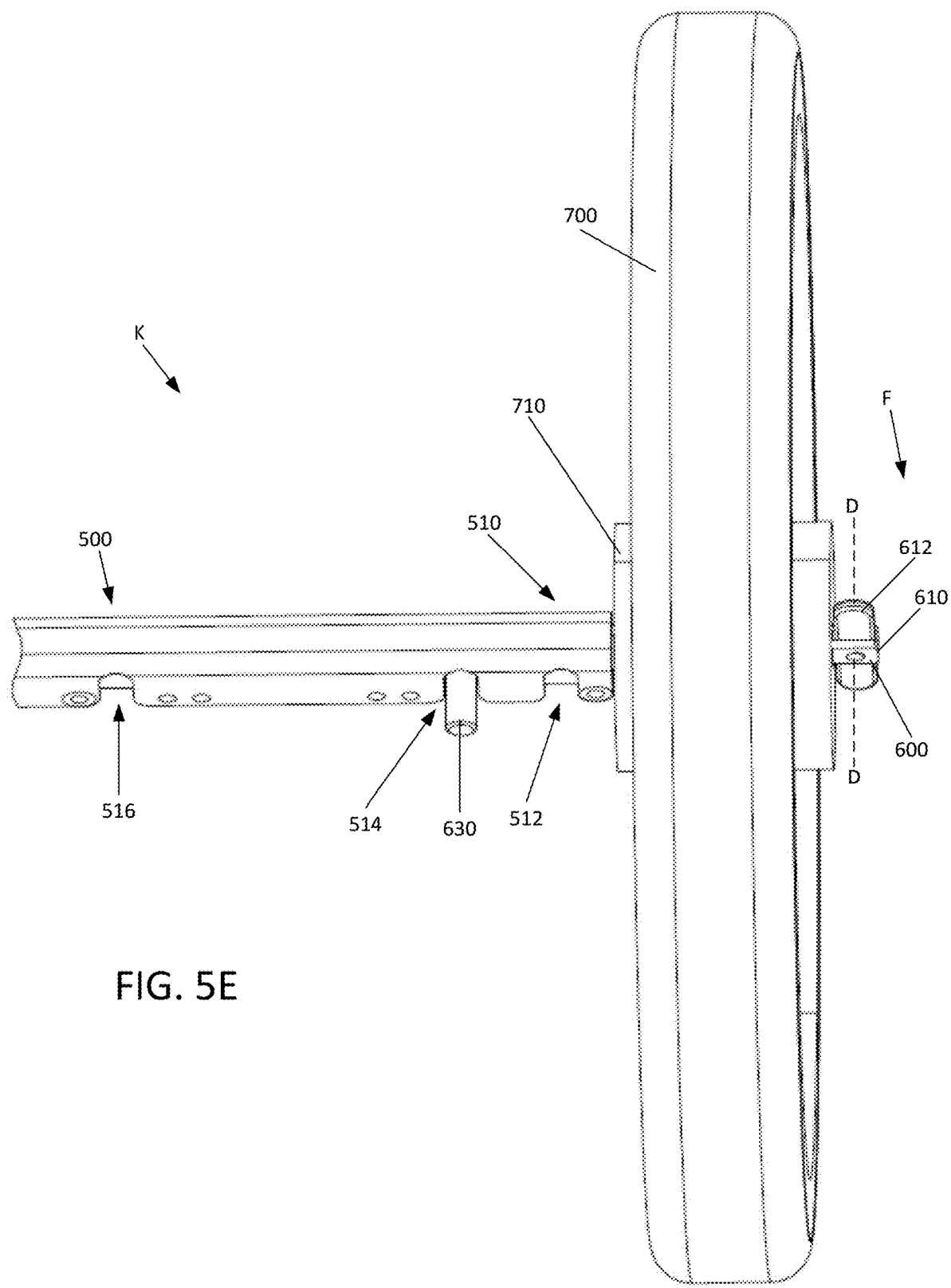
FIG. 5E illustrates a side view of the end of the axle assembly illustrated in FIG. 5A, the end of the axle assembly shown in isolation with the axle in a final or fourth deployed position, where the wheel is disposed on the axle and the rotatable tab is disposed in the transverse/deployed position.

FIG. 5E illustrates the final or fourth deployed configuration K, where the wheel 700 is secured to the axle 600 and lateral play or slop in the wheel 700 along the axle 600 is minimized. When converting the axle assembly from the third deployed configuration J to the final deployed configuration K, the axle 600 may be rotated (approximately 90 degrees) until the protrusion 630 of the axle 600 rotates out of the outermost slot 512. The axle 600 may then be slid or pushed inward along the channel 560 of the axle housing 500 until the protrusion 630 is aligned with the intermediate slot 514. The axle 600 may then be rotated until the protrusion 630 is disposed within the intermediate slot 514 to secure the axle 600 in this position. As illustrated in FIG. 5E, this position of the axle 600 secures the hub 710 of the wheel 700 proximate to both the first end 510 of the axle housing 500 and the rotatable tab 612. Thus, the final deployed configuration K of the axle assembly minimizes the amount the wheel 700 is able to slide back and forth on the axle 600, and maximizing its rotating efficiency.

The steps described above with respect to FIGS. 5A-5E, when performed in reverse, facilitate the removal of the wheels 700 from the axle housing 500 and axles 600, and thus, the collapsible support structure 10, as well as storage of the axles 600 within the axle housing 500.

Figure 6A:
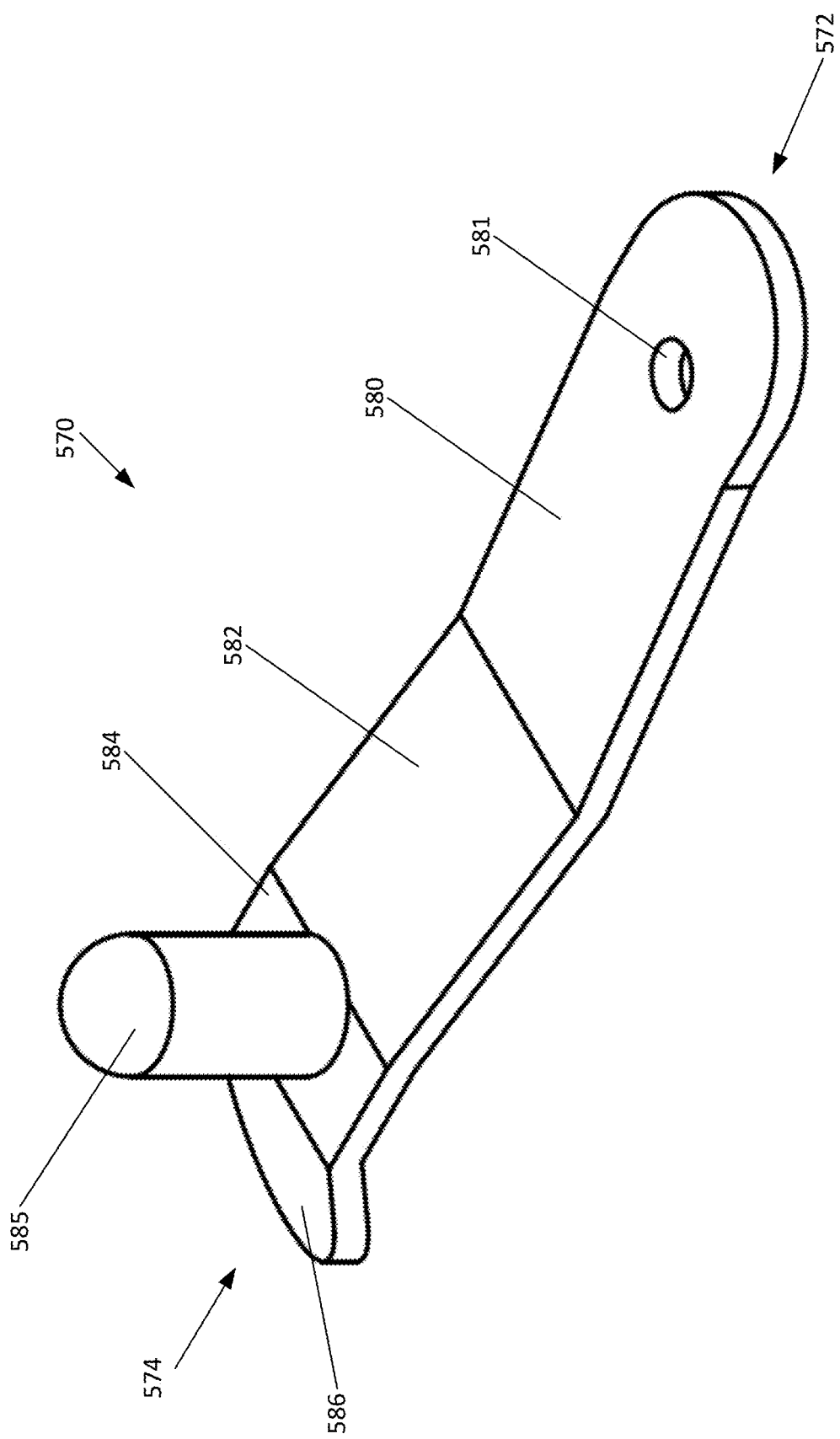
FIG. 6A illustrates a perspective view of an embodiment of a snap button utilized with an additional embodiment of the axle assembly of the collapsible support structure shown in FIG. 1A.
Figure 6B:
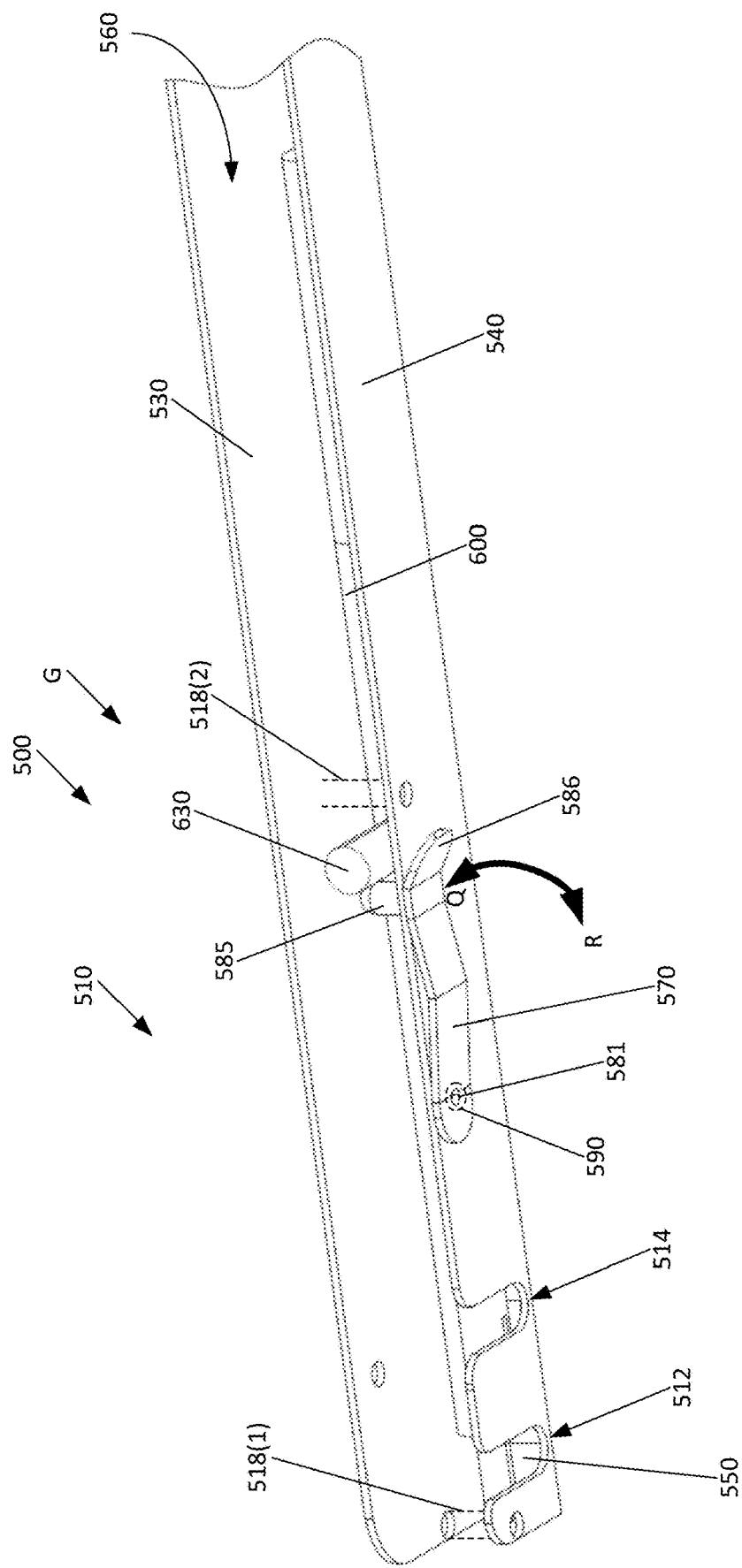
FIG. 6B illustrates a side view of an additional embodiment of an axle assembly (i.e., axle housing and one of the axles) that may be equipped on the collapsible support structure shown in FIG. 1A, the axle assembly utilizing the snap button shown in FIG. 6A, one end of the axle assembly shown in isolation with the axle in a stowed/storage position.
Figure 6C:
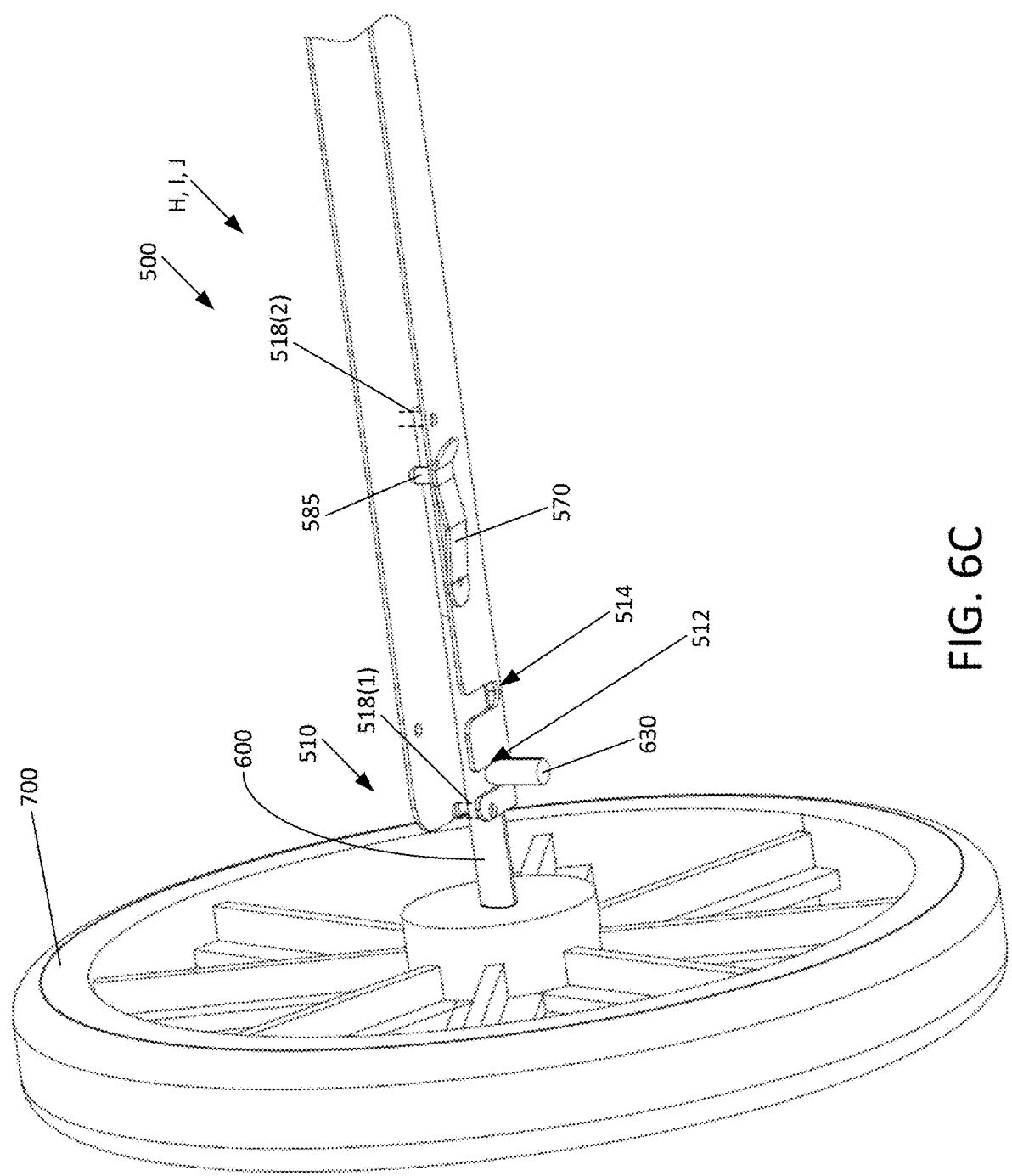
FIG. 6C illustrates a side view of the end of the axle assembly illustrated in FIG. 6B, the end of the axle assembly shown in isolation with the axle in one of the deployed positions, where the wheel is disposed on the axle.
Figure 6D:
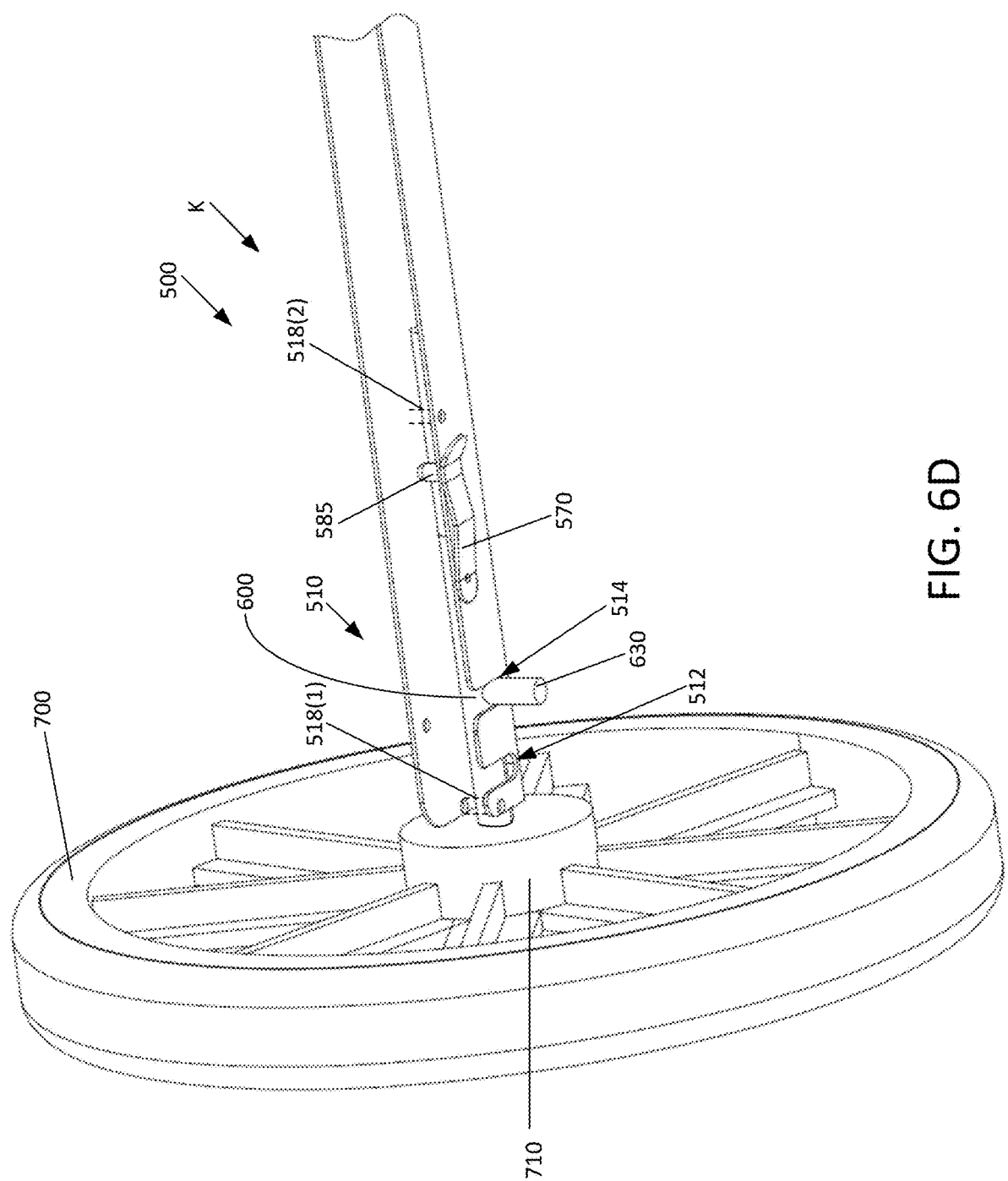
FIG. 6D illustrates a side view of the end of the axle assembly illustrated in FIG. 6B, the end of the axle assembly shown in isolation with the axle in a final or fourth deployed position, where the wheel is disposed on the axle.

Turning to FIGS. 6A-6D, illustrated are views of a snap button 570 and isolated views of an additional embodiment of the axle housing 500 that is equipped with the snap button 570 instead of the innermost slot 516, like that of the axle housing 500 illustrated in FIGS. 3 and 5A-5E. More specifically, FIG. 6A illustrates an isolated view of the snap button 570, while FIGS. 6B-6D illustrate the first end 510 of an embodiment of the axle housing 500 that is equipped with the snap button 570. While FIGS. 6B-6D only illustrate the first end 510 of the additional embodiment of the axle housing 500, one of the axles 600, and one of the wheels 700, the discussion of FIGS. 6B-6D applies to the second end 520 of the additional embodiment of the axle housing 500, the second axle 600, and the second wheel 700, as they are identical, but mirrored, to the first end 510 of the additional embodiment of the axle housing 500, the first axle 600, and the first wheel 700.

FIG. 6A illustrates a perspective view of a snap button 570 that may be utilized on both the first end 510 and the second end 520 of the additional embodiment of the axle housing 500. The snap button 570 is an elongate member that includes a first end 572 and an opposite second end 574. The snap button 570, moreover, includes a first segment 580, second segment 582, third segment 584, and fourth segment 586. Each of the segments 580, 582, 584, 586 may be oriented at an offset angle with respect to its adjacent segments 580, 582, 584, 586. In other words, the second segment 582, which is coupled to the first segment 580, may extend in a direction that is angularly offset from the first segment 580 such that the first segment 580 and the second segment 582 are not parallel with, or aligned within the same plane as, one another. Similarly, the third segment 584, which is coupled to the second segment 582, may extend in a direction that is angularly offset from the second segment 582 such that the second segment 582 and the third segment 584 are not parallel with, or aligned within the same plane as, one another. Finally, the fourth segment 586, which is coupled to the third segment 584, may extend in a direction that is angularly offset from the third segment 584 such that the third segment 584 and the fourth segment 586 are not parallel with, or aligned within the same plane as, one another. Thus, as illustrated in FIG. 6A, the snap button 570 may have a substantially arch-like shape between the first end 572 and the second end 574 of the snap button 570. In other embodiments, the snap button 570 may have a flat shape. Disposed on the first segment 580 proximate to the first end 572 of the snap button 570 is an aperture or opening 581, while disposed on the third segment 584 is a protrusion or head 585 of the snap button 570. The head 585 extends from the planar surface of the third segment 584 of the snap button 570. In other embodiments of the snap button 570, the head 585 may be located on a different segment or located at a different position along the snap button 570.

Turning to FIG. 6B, illustrated is the first end 510 of the additional embodiment of the axle housing 500. The embodiment of the axle housing 500 illustrated in FIG. 6B, is substantially similar to the embodiment of the axle housing 500 illustrated in FIG. 3, except, instead of having an innermost slot 516 disposed proximate to the second pillar 518(2) as illustrated in the embodiment illustrated in FIG. 3, the embodiment of the axle housing 500 illustrated in FIG. 6B contains a snap button 570. The snap button 570, as illustrated in FIG. 6B, is coupled to the bottom side 540 of the axle housing 500 proximate to the second pillar 518(2). A fastener 590 that extends through the opening 581 of the first segment 580 of the snap button 570 may couple the snap button 570 to the bottom side 540 of the axle housing 500. Due to the shape and angular orientations of the various segments 580, 582, 584, 586 of the snap button 570, the snap button 570 may be biased to the axle retaining position Q, which is the position of the snap button 570 that is illustrated in FIG. 6B. When in the axle retaining position Q, the head 585 of the snap button 570 extends through the bottom side 540 of the axle housing 500 and into the channel 560. A user may engage the fourth segment 586 to bend or manipulate the snap button 570 to the axle releasing position R, where the amount that the head 585 extends into the channel 560 is reduced or eliminated when compared to the axle retaining position Q. When the user releases, or head 585 is no longer engaged with the fourth segment 586, the snap button 570 is biased back to the axle retaining position Q.

As illustrated in FIG. 6B, the axle 600 is slidably disposed within the channel 560 of the axle housing 500 in a stowed or storage configuration G. When the axle 600 is disposed in the storage position G and the snap button 570 is in the axle retaining position Q, the protrusion 630 of the axle 600 may be disposed between the head 585 of the snap button 570 and the second pillar 518(2) of the axle housing 500. Thus, the head 585 of the snap button 570 serves to prevent the axle 600 from sliding along the channel 560 to one of the axle deployed configurations H, I, J, K.

When a user wishes to deploy the axle 600 and secure a wheel 700 to the axle 600, the snap button 570 must be bent or manipulated from the axle retaining position Q to the axle releasing position R to at least partially slide the head 585 of the snap button 570 out of the channel 560 of the axle housing 500 (i.e., to at least reduce the amount that the head 585 of the snap button 570 extends into the channel 560 of the axle housing 500). Once the snap button 570 has been manipulated to the axle releasing position R, the protrusion 630 of the axle 600 may slide past the head 585 of the snap button 570 until the protrusion 630 is aligned with the outermost slot 512 of the axle housing 500 (e.g., the first pillar 518(1) may engage the protrusion 630 to prevent the axle 600 from sliding completely out of the channel 560). The axle 600 may then be rotated until the protrusion 630 is disposed within the outermost slot 512 (approximately 90 degrees), and the axle assembly is in the first deployed configuration H, as illustrated in FIG. 6C. Like that previously explained with regard to FIGS. 5B-5D, when the axle 600 is in the first deployed configuration H, the first end 610 of the axle 600 extends from the first end 510 of the axle housing 500. This allows the user to then place a wheel 700 onto the axle 600 by sliding the wheel 700 over the first end 610 of the axle 600, where the axle 600 is then in the second deployed configuration I. Once the wheel 700 is slid over the first end 610 of the axle 600, the rotatable tab 612 (not shown in FIGS. 6B-6D) may be rotated about axis D to the transverse position F (best shown in FIGS. 4A and 5D) to secure the wheel 700 to the axle 600 (i.e., preventing the wheel 700 from sliding beyond the first end 610 of the axle 600). When this occurs, the axle 600 is in the third deployed configuration J.

As best illustrated in FIG. 6D, and as previously explained with regard to FIG. 5E, the axle 600 may then be placed in the final or fourth deployed configuration K, where the wheel 700 is secured to the axle 600 and lateral play or slop in the wheel 700 along the axle 600 is minimized. When converting the axle assembly from the third deployed configuration J to the final deployed configuration K, the axle 600 may be rotated (approximately 90 degrees) until the protrusion 630 of the axle 600 rotates out of the outermost slot 512. The axle 600 may then be slid or pushed inward along the channel 560 of the axle housing 500 until the protrusion 630 becomes aligned with the intermediate slot 514. The axle 600 may then be rotated until the protrusion 630 is disposed within the intermediate slot 514 to secure the axle 600 in this position. As illustrated in FIG. 6D and previously explained with regard to FIG. 5E, this position of the axle 600 secures the hub 710 of the wheel 700 proximate to both the first end 510 of the axle housing 500 and the rotatable tab 612. Thus, the final deployed position K of the axle assembly minimizes the amount the wheel 700 is able to slide back and forth on the axle 600, and maximizing its rotating efficiency.

The steps described above with respect to FIGS. 6B-6D, when performed in reverse, facilitate the removal of the wheels 700 from the axle housing 500 and axles 600, and thus, the collapsible support structure 10, as well as storage of the axles 600 within the axle housing 500.

Turning to FIGS. 7A-7D, illustrated are the various components of the handle assembly, which comprises of a handle 800 and a bracket 850 that slidably secures the handle 800 to the horizontal support portion 100. Best illustrated in FIGS. 7A-7D, the handle 800 is an elongate member having a first end 810, a second end 820 opposite the first end 810, and square cross-section. The handle 800 may further include a set of protuberances 830 extending from the sidewalls of the handle 800 proximate to the first end 810 of the handle 800. In the embodiment illustrated, the protuberances 830 may be formed by a combination of a bolt that extends through the first end 810 of the handle 800 and is secured to the first end 810 via a nut. Moreover, the handle 800 may also include at least one snap button 840 disposed proximate to the protuberances 830. The at least one snap button 840 be resilient such that, after being depressed into the sidewall of the handle 800, the snap button 840 returns to protrude out from the sidewall of the handle 800.

FIG. 7B illustrates an exploded view of the handle assembly. As shown, the bracket 850 is substantially U-shaped, and contains a channel 852 that receives the handle 800, and through which the handle 800 may slide. The bracket 850 may further include at least one aperture 854 configured to receive and/or engage the at least one snap button 840 of the handle 800. As shown in FIG. 7B, the bracket 850 may be secured to the bottom surface 124 of the surface structure 120 of the horizontal support portion 100 proximate to the front face wall 126. This in turn secures the handle 800 against the bottom surface 124 of the surface structure 120 of the horizontal support portion 100. As shown in FIG. 7B, and later shown in FIGS. 7C and 7D, the bracket 850 positions the handle 800 between the bottom surface 124 of the surface structure 120 and the cross brace 130 of the horizontal support portion 100. The bracket 850 and the handle 800 are positioned centrally between, and equidistance from, the longitudinal side frame members 110(1), 110(2) such that the handle is aligned with, and at times, at least partially disposed through, the opening 127 on the front face wall 126 of the surface structure 120 of the horizontal support portion 100.

As illustrated in FIGS. 7C and 7D, the handle 800 is slidably repositionable between a deployed position L (shown in FIG. 7C) and a storage position M (shown in FIG. 7D). As illustrated in FIG. 7C, the handle 800 has been slid through the bracket 850 such that the first end 810 of the handle 800 is disposed proximate to the bracket 850, and the handle 800 is extending through the opening 127 of the front face wall 126 of the surface structure 120 of the horizontal support portion 100. In this deployed position L, the handle 800 extends from the front end 11 of the collapsible support structure 10 such that the second end 820 of the handle 800 is spaced from the front face wall 126 the surface structure 120 of the horizontal support portion 100. In the deployed position L, when the handle 800 is equipped with at least one snap button 840, the snap button 840 may be configured to interact with, and be received by, the aperture 854 in the bracket 850 to secure the handle 800 in the deployed position L. For embodiments containing at least one snap button 840, only when the at least one snap button 840 is depressed, such that it does not engage with the aperture 854 of the bracket 850, may the handle 800 be repositioned from the deployed position L to the storage position M.

As illustrated in FIG. 7D, the handle 800 is positioned in the storage position M. To reposition the handle 800 from the deployed position L to the storage position M, the handle 800 must be slid through the bracket 850 such that the first end 810 of the handle is disposed proximate to the rear face wall 128 of the surface structure 120 of the horizontal support portion 100 and the second end 820 of the handle 800 is disposed proximate to the front face wall 126 of the surface structure 120 of the horizontal support portion 100. As shown in FIG. 7D, the handle 800 is disposed nearly completely under the surface structure 120 of the horizontal support portion 100. Moreover, the handle 800 is disposed between the bottom surface 124 of the surface structure 120 and both the cross brace 130 and the axle housing 500. When in the storage position M, the handle 800 may not extend through the opening 127 on the front face wall 126 or beyond the front face wall 126 of the surface structure 120 of the horizontal support portion 100.

In other embodiments, the handle 800 may be equipped with multiple snap buttons 840 disposed along the length of the handle 800. At least one of the multiple snap buttons 840 may secure or retain the handle 800 in each of the deployed position L (i.e., once in the deployed position L, at least one multiple snap button 840 may prevent the handle 800 from sliding or being repositioned out of the deployed position L without actuation of the at least one multiple snap button 840) and the storage position M (i.e., once in the storage position M, at least one other multiple snap button 840 may prevent the handle 800 from sliding or being repositioned out of the storage position M without actuation of the at least one other multiple snap button 840). Furthermore, actuation of each of the multiple snap buttons 840 at various times during the repositioning of the handle 800 may be required to fully reposition the handle 800 between the deployed position L and the storage position M. Moreover, for some embodiments, simultaneous actuation of two or more of the multiple snap buttons 840 may be required to reposition the handle 800 between the deployed position L and the storage position M.

Figure 8A:
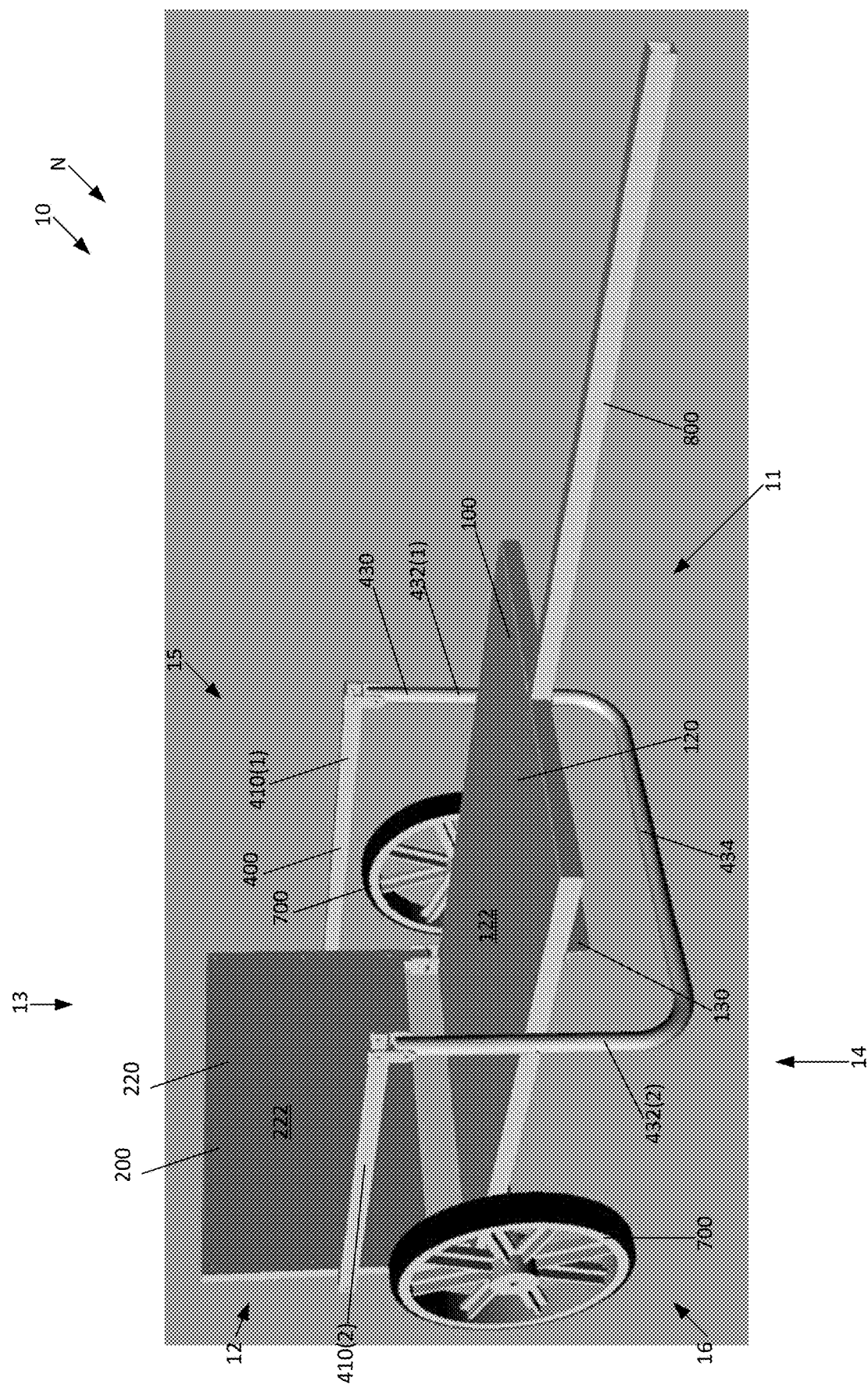
FIGS. 8A-8C illustrate the folding process of the collapsible support structure shown in FIG. 1A, where the collapsible support structure shown in FIG. 1A is depicted in perspective views of various states between the completely deployed configuration and the completely stowed/folded configuration.
Figure 8B:
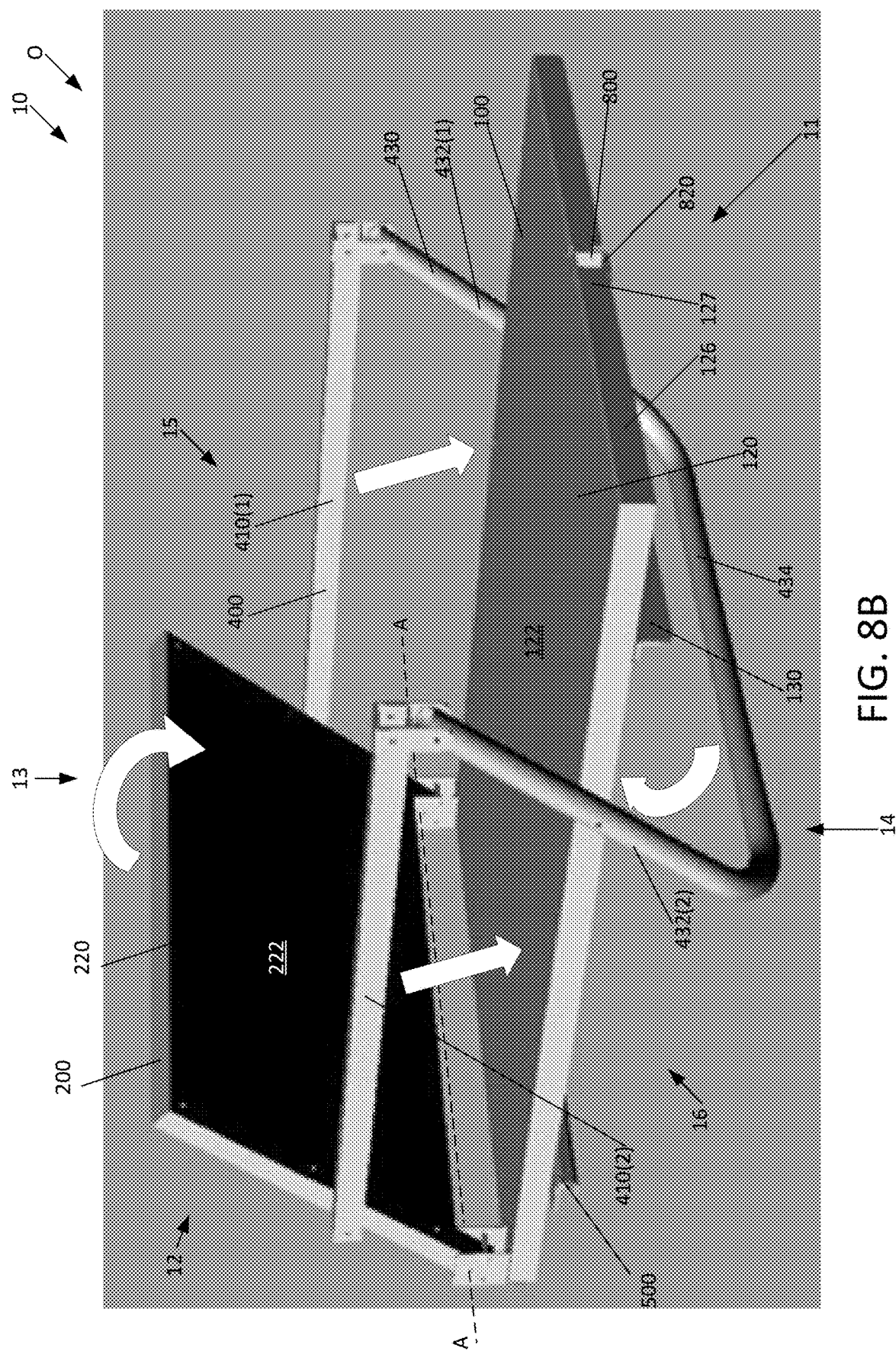
Figure 8C:
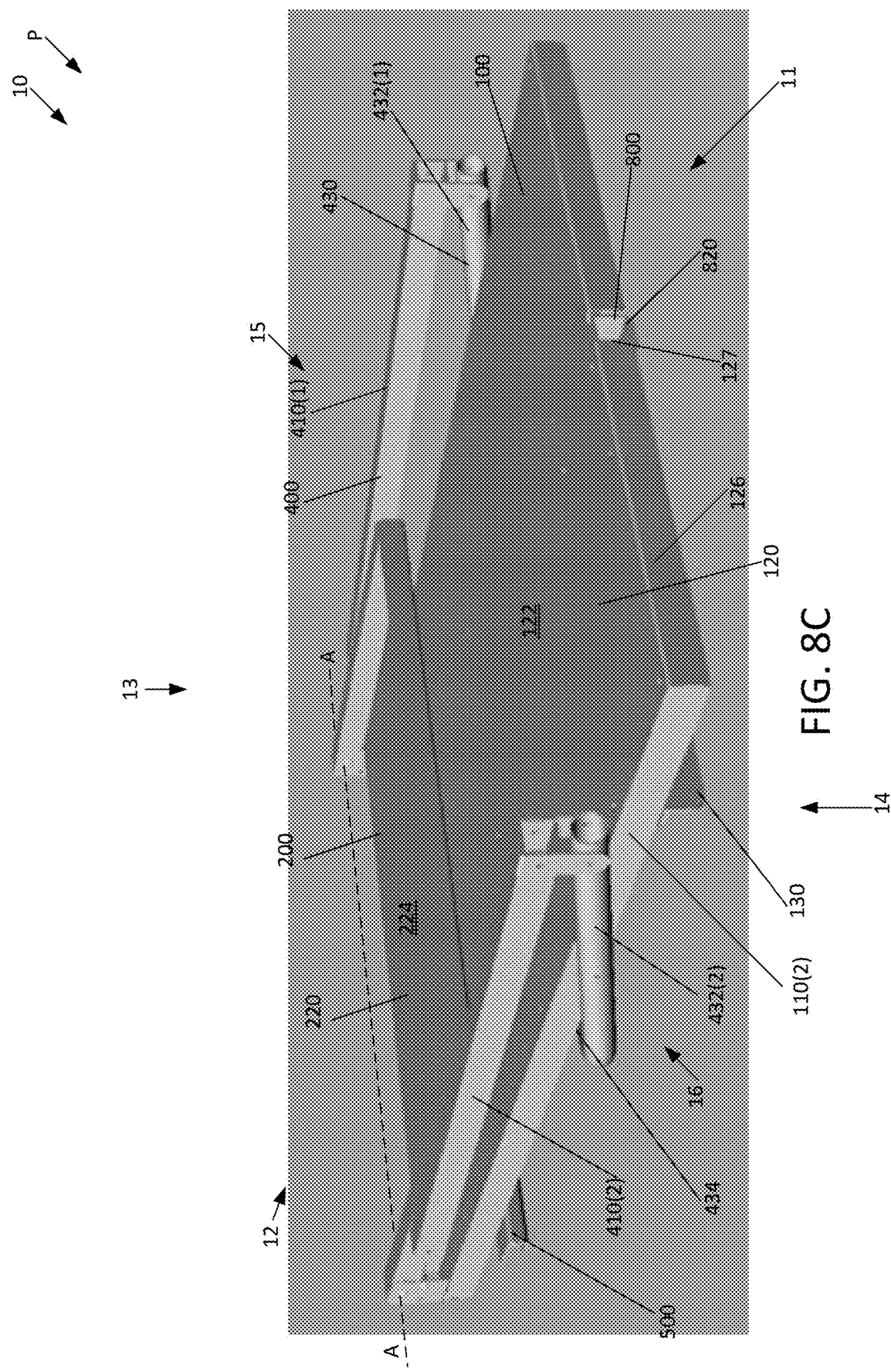

Referring to FIGS. 8A-8C, the collapsible support structure 10 is illustrated demonstrating the folding process, where the collapsible support structure 10 is folded from its deployed configuration N in FIG. 8A to its folded configuration P in FIG. 8C. As illustrated in FIG. 8A, the collapsible support structure 10 is in the deployed configuration with the vertical support portion 200 oriented substantially perpendicular to the horizontal support portion 100. As previously explained with respect to FIGS. 2A-2C, when the removable pin 362 is disposed within the U-brackets 300, the vertical support portion 200 is retained in the vertical position B (shown in FIG. 2B). Furthermore, when the collapsible support structure 10 is in the deployed configuration N, the wheels 700 may be disposed on the axles 600, as explained with respect to FIGS. 5A-5E. Moreover, the side rails 400 extend from the vertical support portion 200 such that the horizontal elongate members 410(1), 410(2) are substantially parallel to the horizontal support portion 100, and the horizontal section 434 of U-shaped leg member 430 engages a support surface. In addition, when in the fully deployed configuration N, the handle 800 may extend from the front face wall 126 of the surface structure 120 of the horizontal support portion 100.

As illustrated in FIGS. 8B and 8C, the wheels 700 have been removed and the axles 600 have been positioned to their storage position G by being slid into the axle housing 500 in accordance with that described with respect to FIGS. 5A-5E. Moreover, the handle 800 has been repositioned from the deployed position L to the storage position M in accordance with that described with respect to FIGS. 7A-7D. As further illustrated in FIG. 8B, the removable pins 362 have been removed from the U-brackets 300 enabling the vertical support portion 200 to rotate about axis A such that the front surface 222 of the surface structure 220 of the vertical support portion 200 is rotating toward the top surface 122 of the surface structure 120 of the horizontal support portion 100. FIG. 8B illustrates the collapsible support structure 10 in a folding configuration O. Because the side rails 400 are pivotally coupled to both the vertical support portion 200 and the horizontal support portion 100, as the vertical support portion 200 rotates toward the horizontal support portion 100, the horizontal elongate members 410(1), 410(2) translate down toward the top surface 122 of the surface structure 120 of the horizontal support portion 100, while the horizontal section 434 of the U-shaped leg member 430 rotates toward the bottom surface 124 of the surface structure 120 of the horizontal support portion 100.

FIG. 8C illustrates the collapsible support structure 10 in the completely folded configuration P. As shown in FIG. 8C, when the collapsible support structure 10 is in the completely folded configuration P, the surface structure 220 of the vertical support portion 200 lies in parallel with the surface structure 120 of the horizontal support portion 100. In addition, the horizontal elongate members 410(1), 410(2) are also in parallel with both the surface structure 120 of the horizontal support portion 100 and the surface structure 220 of the vertical support portion 200. Moreover, the horizontal section 434 of the U-shaped leg member 430 is disposed against the longitudinal side frame members 110(1), 110(2) of the horizontal support portion 100. As previously explained with respect to FIG. 8B, the wheels 700 have been removed and the axles 600 have been positioned to their storage position G by being slid into the axle housing 500 in accordance with that described with respect to FIGS. 5A-5E. Moreover, the handle 800 has been repositioned from the deployed position L to the storage position M in accordance with that described with respect to FIGS. 7A-7D. In some embodiments, when in the completely folded configuration P, the removable pins 362 may be inserted into the U-brackets to prevent the vertical support portion 200 from rotating about axis A, and to retain the collapsible support structure 10 in the completely folded configuration P. In addition, some embodiments of the collapsible support structure 10 enable the wheels 700 to be placed onto the axles 600 when the collapsible support structure 10 is in the completely folded configuration P to enable the completely folded configuration P version of the collapsible support structure 10 to be rolled across a support surface. In this embodiment, the handle 800 may also be positioned in the deployed position L while the rest of the components of the collapsible support structure 10 are in the completely folded configuration P.

While the invention has been described in detail and with reference to specific embodiments thereof, it will be apparent to one skilled in the art that various changes and modifications can be made therein without departing from the spirit and scope thereof. It is to be understood that terms of reference such as "top", "bottom", "front", "rear", "side", "height", "length", "width", "upper", "lower", "interior", "exterior", and the like as may be used herein, merely describe points of reference and do not limit the present invention to any particular orientation or configuration. Similarly, various words and phrases, such as "perpendicular", and "parallel", are used to describe the location of the invention's components in space, direction, orientation or in relation to other components. The word "slot" is used to describe a slot, gap or similar opening, channel or passage. Where applicable such, words and phrases also incorporate adjectives such as "approximately", "substantially", or "generally" to encompass the full range of embodiments possible. Thus, it is intended that the present invention covers the modifications and variations of this invention provided they come within the scope of the appended claims and their equivalents.

What is claimed is:

1. An axle assembly for a collapsible structure, the axle assembly comprising:
    an axle housing, the axle housing including a first end and a second end, the axle housing further comprising:
        a first planar portion,
        a second planar portion coupled to the first planar portion,
        a third planar portion coupled to the second planar portion and oriented parallel to the first planar portion, the first planar portion, the second planar portion, and the third planar portion collectively defining a channel extending between the first end and the second end,
        a first slot disposed on the third planar portion proximate to the first end of the axle housing; and
    an axle slidably disposed within the channel of the axle housing, the axle including a first axle end, an opposite second axle end, and a protrusion extending from the axle at a location between the first axle end and the second axle end, the protrusion being configured to fit within the first slot.

2. The axle assembly of claim 1, wherein the axle is repositionable about the channel of the axle housing between a storage position, where the second axle end is disposed a first distance from the first end of the axle housing, and a deployed position, where the second axle end is disposed a second distance from the first end of the axle housing, the second distance being greater than the first distance.

3. The axle assembly of claim 2, wherein the axle further comprises:
    a tab rotatably coupled to the second axle end, the tab being rotatable about an axis that extends through the second axle end between a first position, where the tab is transversely oriented with respect to the axle, and a second position, where the tab is collinear with the axle.

4. The axle assembly of claim 3, wherein, when the axle is in the deployed position, the protrusion of the axle is disposed within the first slot.

5. The axle assembly of claim 4, wherein the deployed position is a first deployed position, and the axle housing further comprising:
    a second slot disposed on the third planar portion, the second slot being disposed more proximate to the first end of the axle housing than the first slot,
    wherein the axle is further repositionable to a second deployed position, when the axle is in the second deployed position, the protrusion of the axle is disposed within the second slot and the second axle end is disposed a third distance from the first end of the axle housing, the third distance being greater than the first distance and the second distance, and
    wherein, when the axle is in the second deployed position and a wheel is disposed on the axle, the tab is capable of rotating between the first position and the second position.

6. The axle assembly of claim 4, the axle housing further comprising:
    a second slot disposed on the third planar portion, the first slot being disposed more proximate to the first end of the axle housing than the second slot, wherein, when the axle is in the storage position, the protrusion of the axle is disposed within the second slot.

7. The axle assembly of claim 4, the axle housing further comprising:
    a snap button disposed on the third planar portion, the first slot being disposed more proximate to the first end of the axle housing than the snap button, the snap button being configurable between a retaining position, where a head of the snap button extends through the third planar portion and into the channel of the axle housing a first length, and a releasing position, where the head of the snap button extends into the channel of the axle housing a second length that is less than the first length, and
    wherein, when the axle is in the storage position and the snap button is in the retaining position, the head of the snap button engages the protrusion of the axle to prevent the axle from sliding out of the storage position.

* * * * *